United States Patent [19]

Jourdenais et al.

[11] Patent Number: 5,278,986
[45] Date of Patent: Jan. 11, 1994

[54] SYSTEM AND METHOD FOR COMPILING A SOURCE CODE SUPPORTING DATA PARALLEL VARIABLES

[75] Inventors: Karen C. Jourdenais, Concord; James L. Frankel, Lexington, both of Mass.; Steven N. Goldhaber, Boulder, Colo.; Linda J. Seamonson, Wellesley, Mass.

[73] Assignee: Thinking Machines Corporation, Cambridge, Mass.

[21] Appl. No.: 805,566

[22] Filed: Dec. 13, 1991

[51] Int. Cl.$^5$ ............................................. G06F 9/44
[52] U.S. Cl. ............................. 395/700; 364/DIG. 1; 364/280.4; 364/280/ 364/280.5; 364/280.6; 364/229.2
[58] Field of Search .......................... 395/600, 650, 700

[56] References Cited

U.S. PATENT DOCUMENTS

| | | | |
|---|---|---|---|
| 4,598,400 | 7/1986 | Hillis | 370/60 |
| 4,773,038 | 9/1988 | Hillis et al. | 364/900 |
| 4,827,403 | 5/1989 | Steele, Jr. et al. | 364/200 |
| 4,833,606 | 5/1989 | Iwasawa et al. | 395/700 |
| 4,951,192 | 8/1990 | Chase, Jr. et al. | 395/700 |
| 4,965,724 | 9/1990 | Utsumi et al. | 395/700 |
| 4,984,235 | 1/1991 | Hillis et al. | 370/60 |
| 5,088,034 | 2/1992 | Ihara et al. | 395/700 |
| 5,146,594 | 9/1992 | Iitsuka | 395/700 |

OTHER PUBLICATIONS

John Rose et al., "C*: An Extended Language for Data Parallel Programming", TMC Technical Report Series, PL87-5 (Apr. 1987) (Presented at Second International Conference on Supercomputing, May 1987).

C* Reference Manual, Thinking Machines Corporation, Version 4.0A, pp. 1-34 and 61-63, Aug. 1987.
C* User's Guide. Thinking Machines Corporation, Version 4.0A, pp. 14-15, Aug. 1987.
C* Programming Guide, Thinking Machines Corporation, Version 6.0, pp. 1-15, 19-36, 79-86 and 99-112, Nov. 1990.
Paris Reference Manual, Thinking Machines Corporation, Version 6.0, pp. 1-12, 25, 27, and 96-101, Feb. 1991 (first printed Feb. 1989).

*Primary Examiner*—Kevin A. Kriess
*Attorney, Agent, or Firm*—Sterne, Kessler, Goldstein & Fox

[57] ABSTRACT

A compiler for compiling a computer program which is adapted for use with a data parallel computer. The compiler supports variables which involve parallelism. Variables which involve parallelism are parallel variables, templates for parallel variables called shapes, and pointers to parallel variables. For each variable involving parallelism declared globally in the source code, the compiler of the present invention emits in the target code a declaration of a global scalar variable. It further emits in the target code a start trap. When executed, the start trap allocates memory and a data structure for the global variables involving parallelism. The start trap also initializes the data structures and global variables involving parallelism. Finally, the compiler of the present invention emits in the target code one or more statements which, at run time, will cause the start trap to be invoked before the execution of any statement in which one of the global variables involving parallelism is read from or written to.

34 Claims, 20 Drawing Sheets

SYSTEM AND METHOD FOR COMPILING A SOURCE CODE SUPPORTING DATA PARALLEL VARIABLES

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following applications are assigned to the assignee of the present application:

U.S. patent application Ser. No. 07/042,761 now U.S. Pat. No. 5,050,069, filed Apr. 27, 1987, by W. Daniel Hillis, entitled "Method and Apparatus for Simulating M-Dimensional Connection Networks in an N-Dimensional Network Where M is Less Than N", incorporated herein by reference.

U.S. patent application Ser. No. 07/788,052, filed Nov. 5, 1991, by Frankel et al., entitled "A Compiler For Parallel Communication Instructions", incorporated herein by reference.

U.S. patent application Ser. No. 07/788,004, filed Nov. 5, 1991, by Frankel et al., entitled "System and Method For Parallel Variable Optimization", incorporated herein by reference.

U.S. patent application Ser. No. 07/788,003, filed Nov. 5, 1991, by Frankel et al., entitled "System and Method For Shape Selection and Contextualization", incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Pat. No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to a compiler and, more particularly, to a compiler for a data parallel computer.

2. Related Art

A data parallel computer has an array of many parallel processors, each with some associated memory and all acting under the direction of a serial computer called a host. Note that the host and data parallel computer could reside in a single machine. The parallel data computer supports parallel values having multiple data points called positions. The value of a position is called an element. Each parallel processor stores the element of one such position in its local memory.

On some parallel data computers, each parallel value is described by a template called a "shape". A shape is specified by how many dimensions it has and by the number of positions in each of its dimensions. The total number of positions in a shape is the product of the number of positions in each of its dimensions. For example, an 8×4 shape has 32 positions.

All of the parallel processors (or a subset of the parallel processors) can perform a single operation on all of the positions of a parallel value simultaneously. Such an operation is called a parallel operation.

A compiler is a computer program which receives a source program as input. The source program (also called source code) is written in a source language. The compiler translates the source program into an equivalent target program (also called target code). The target program is written in a target language.

Many source and target languages are known. For example, source languages include Basic, Pascal, Fortran, C, and Lisp. Target languages include machine languages as well as other source languages.

Once the target code has been generated by the compiler, it must be processed by a loader/link editor. Among other things, the loader/link editor links scalar variable references to the appropriate declarations, initializes scalar variables and allocates memory for scalar variables. (A scalar variable is a variable which is not a parallel value.)

However, the loader/link editor operates at compile time. (More specifically, if operates after compile-time but before run time.) Generally, communication with the data parallel computer is limited to run time. As a result, the loader/link editor cannot link references and declarations for parallel variables or shapes, allocate memory for parallel values or shapes, or initialize pointers to parallel variables. (A parallel variable is a named identifier of a parallel value.)

Therefore, what is needed is a system and method for processing variables involving parallelism, i.e., parallel variables, shapes and pointers to parallel variables, at run time. (Variables involving parallelism are also referred to as run-time variables.)

SUMMARY OF THE INVENTION

Accordingly, the present invention is directed toward a system and method which generates target code for explicitly linking references and declarations of parallel variables and shapes, allocating memory for parallel variables and shapes, and initializing pointers to parallel variables. The present invention operates as follows.

A front end of a compiler detects declarations of run-time variables in a compilation unit. The front end processes such declarations by updating a symbol table and adding nodes for the declarations to a parse tree.

A middle end of the compiler generates an IR tree from the symbol table and parse tree. The IR tree includes IR nodes for the run-time variable declarations and an <end_compilation_unit> IR node. The <end_compilation_unit> IR node indicates all of the run-time variables declared in the compilation unit and includes IR nodes for allocating and initializing these variables and their associated data structures.

A back end of the compiler generates target code from the IR tree. Specifically, the back end generates target statements (i.e., statements in the target language) from the IR nodes for the run-time variable declarations. From the <end_compilation_unit> IR node, the back end emits a start trap. The start trap is a function which contains target statements to allocate memory and a data structure for each run-time variable listed in the <end_compilation_unit> IR node, and to initialize these variables and data structures. Finally, the back end emits one or more target statements which, at run-time, will cause the start trap to be invoked before the execution of any statement reading from or writing to one of the run-time variables.

Because target code for the memory allocation and initialization required for each of the run-time variables is generated automatically, the system and method of the present invention frees the programmer from such concerns. It thereby facilitates writing programs involving parallel operations.

By emitting the code for memory allocation and initialization in the start trap function, the system and method of the present invention avoids emitting such code as an initializer of the run-time variables. As a result, the target code could be a source language (such as C) which restricts initializers of global variables to constant expressions. Because it has the ability to generate target code in a source language, the system and method of the present invention can generate highly portable target code.

BRIEF DESCRIPTIONS OF THE DRAWINGS

The present invention will be described with reference to the accompanying drawings, wherein.

Figure 1A:
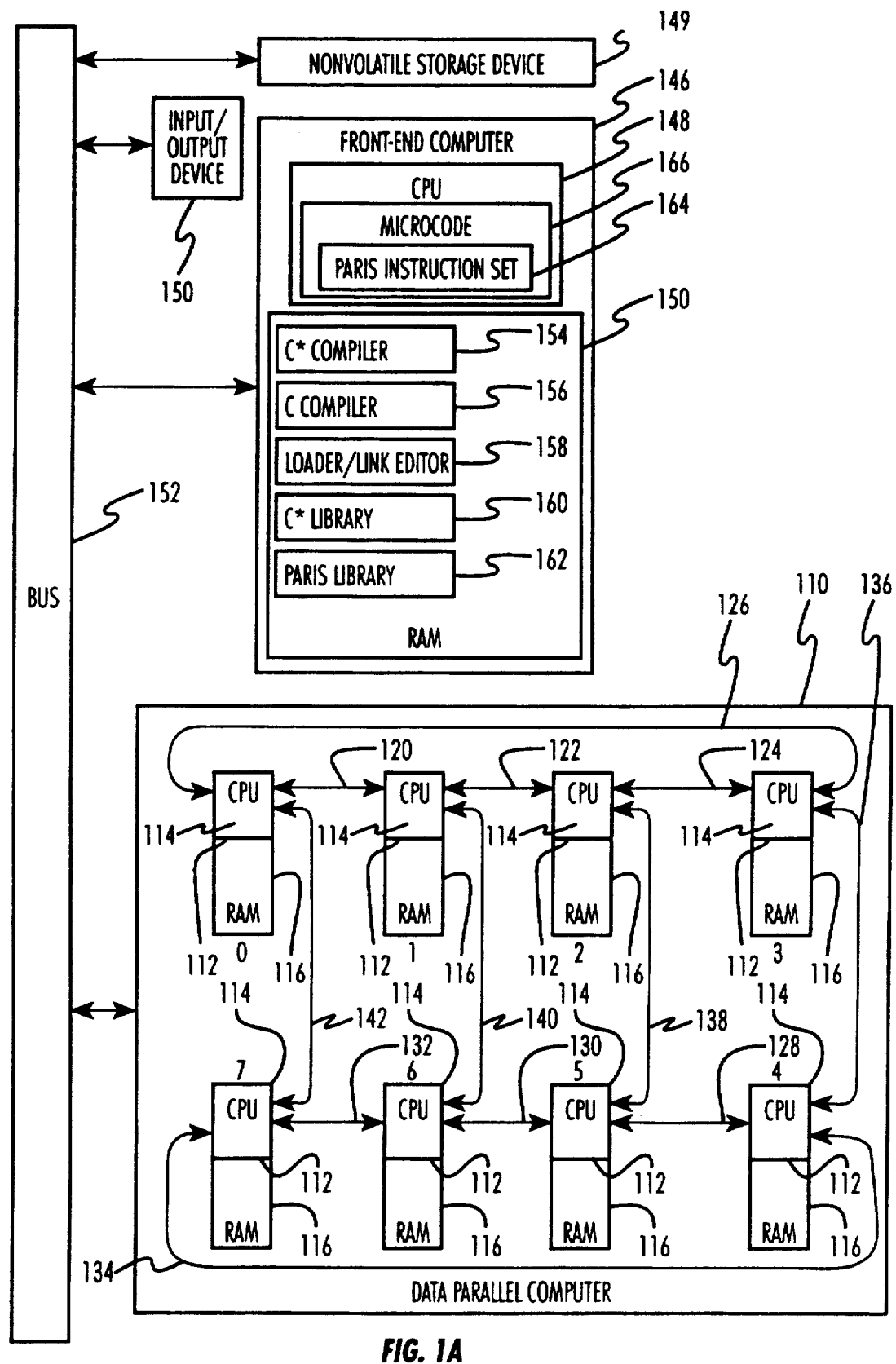
FIG. 1A shows a block diagram of a preferred environment in which the present invention could operate.
Figure 2:
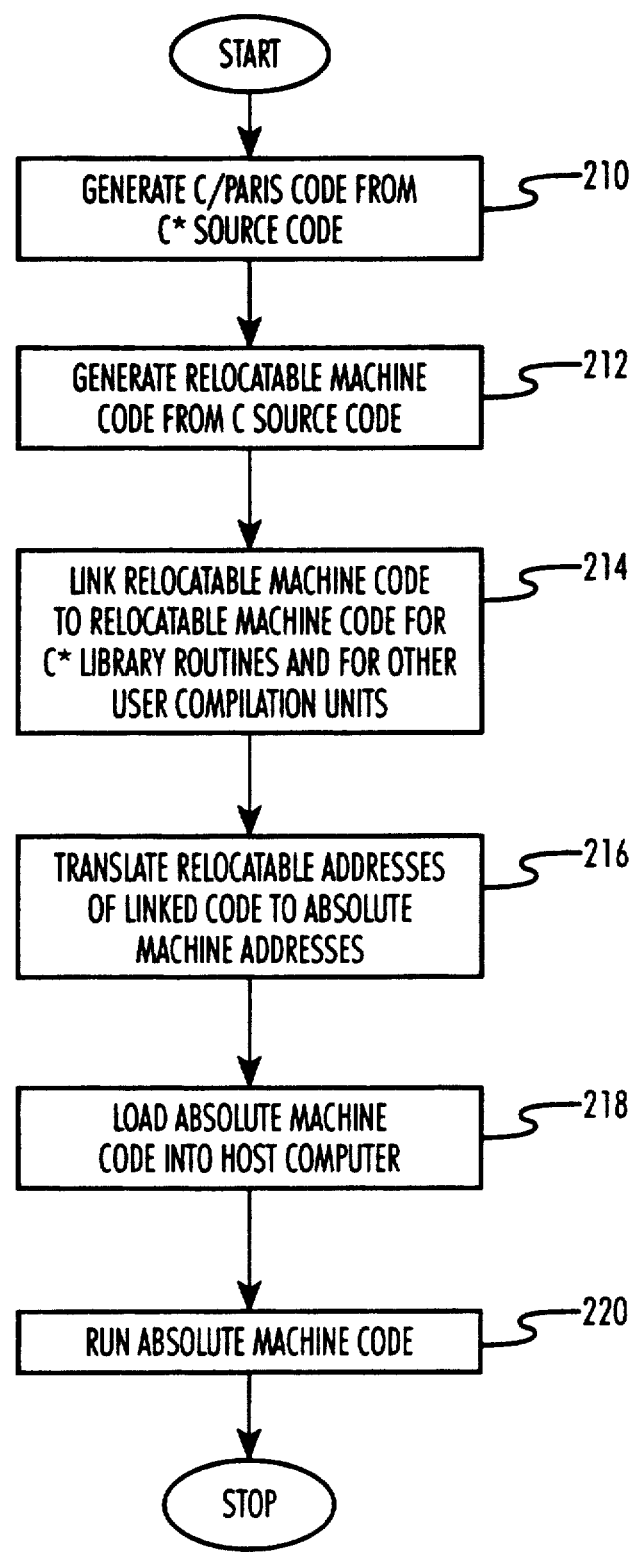

FIG. 2 is a flow chart which illustrates the relationship between software modules 154, 156, 158, 160 and 162 and firmware module 164 of FIG. 1A.

Figure 3:
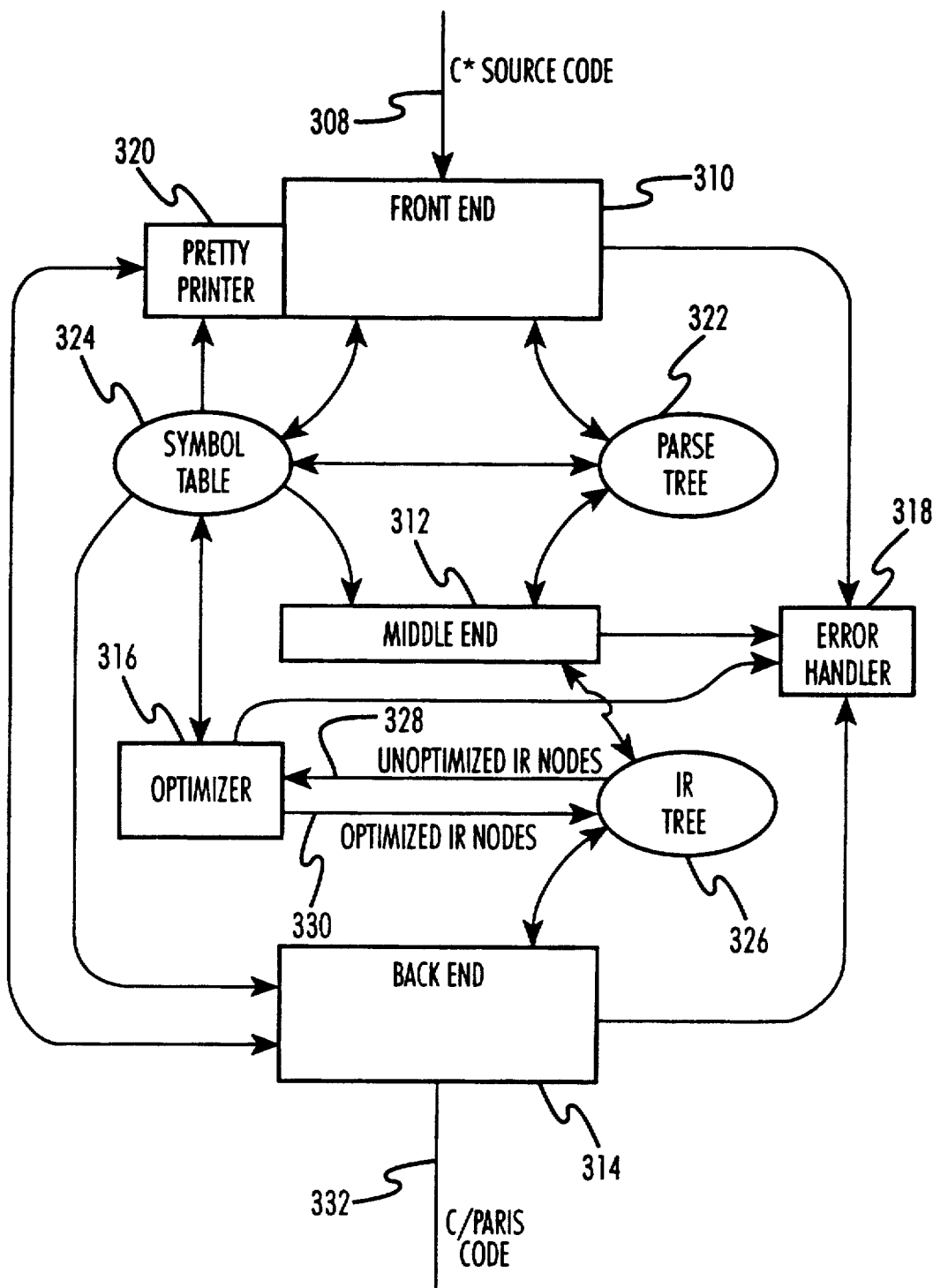

FIG. 3 is a high level block diagram of the structure of a C* compiler of the present invention.

Figure 4:
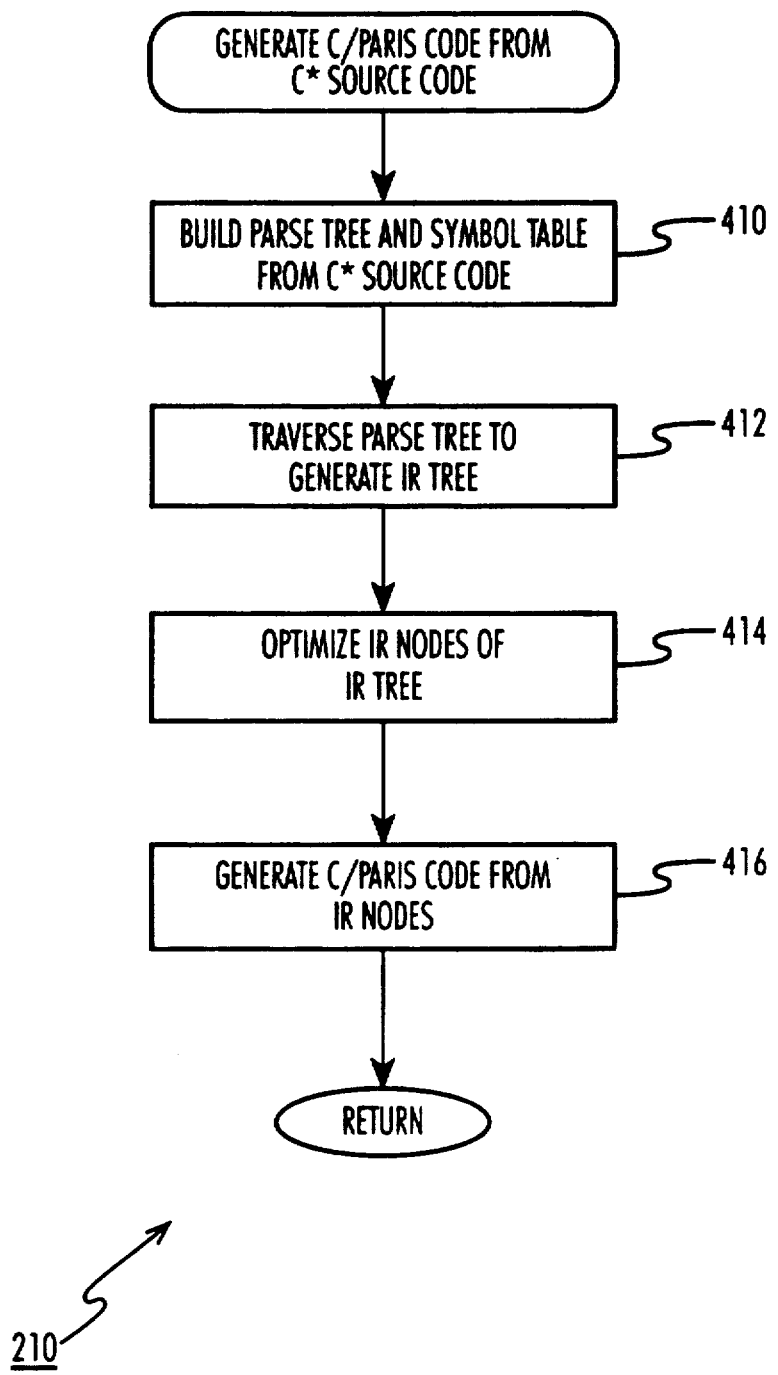

FIG. 4 is a flow chart which illustrates the interaction between modules of FIG. 3.

Figure 5:
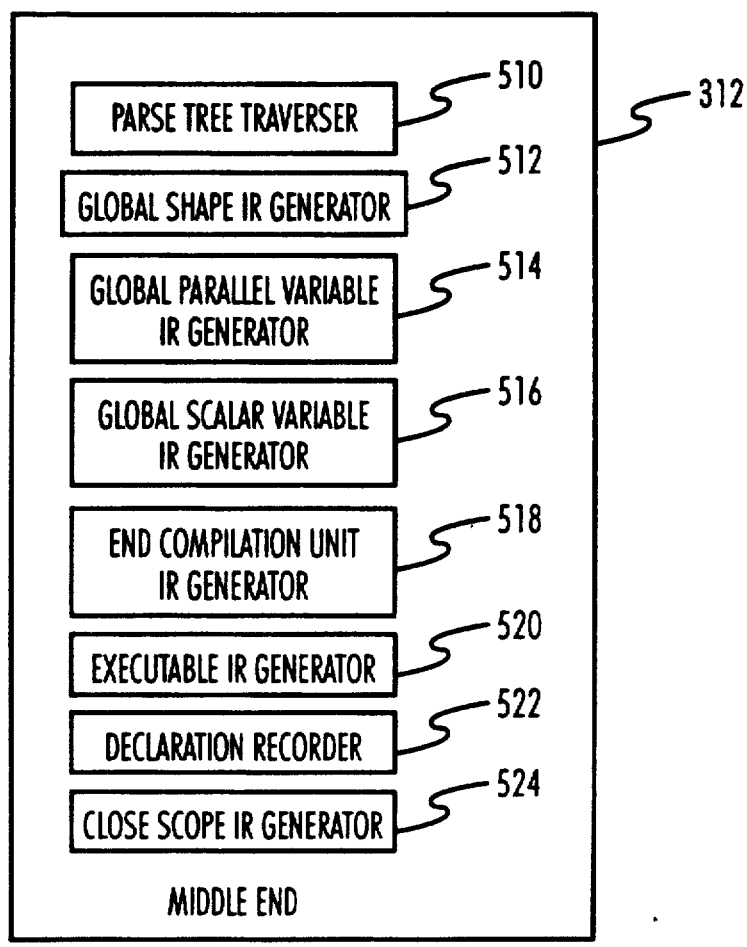

FIG. 5 is a block diagram of the structure of a middle end of FIG. 3.

Figure 6A:
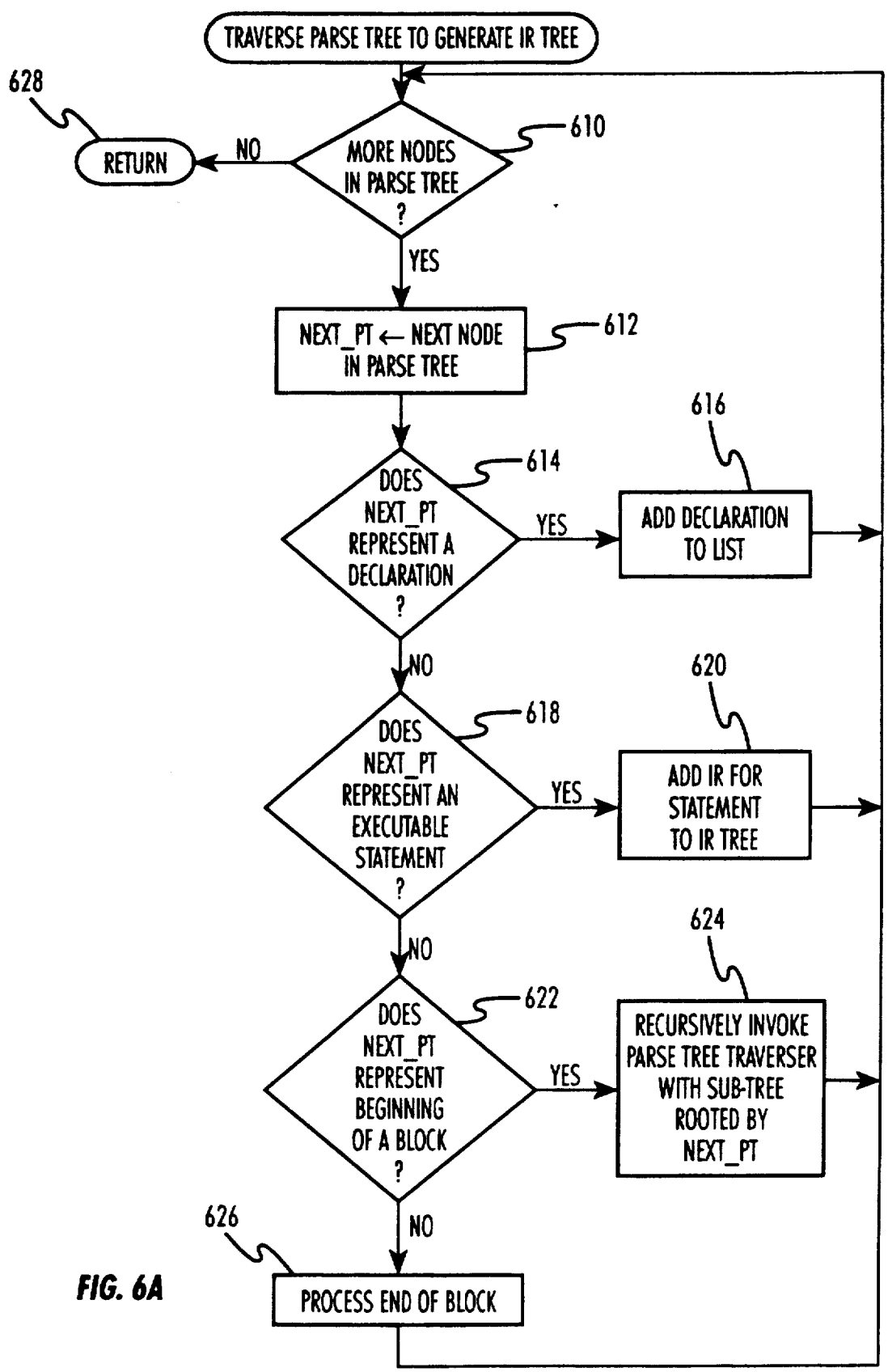

FIG. 6A is a flow chart which illustrates the operation of modules 510, 512, 514, 516, 518, 520, 522 and 524 of FIG. 5.

Figure 6B:
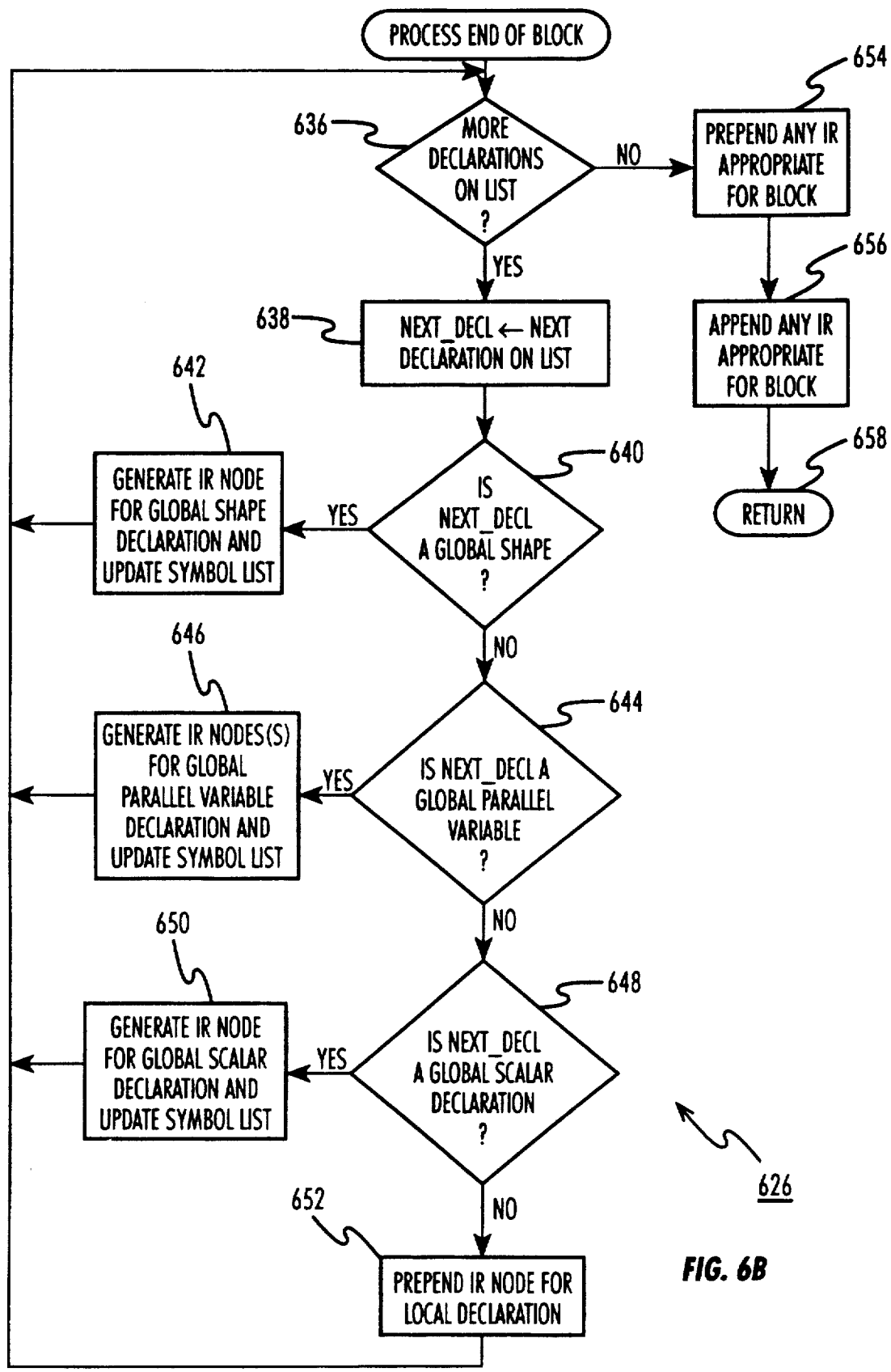

FIG. 6B is a flow chart which illustrates the operation of a close block IR generator of FIG. 5.

Figure 7:
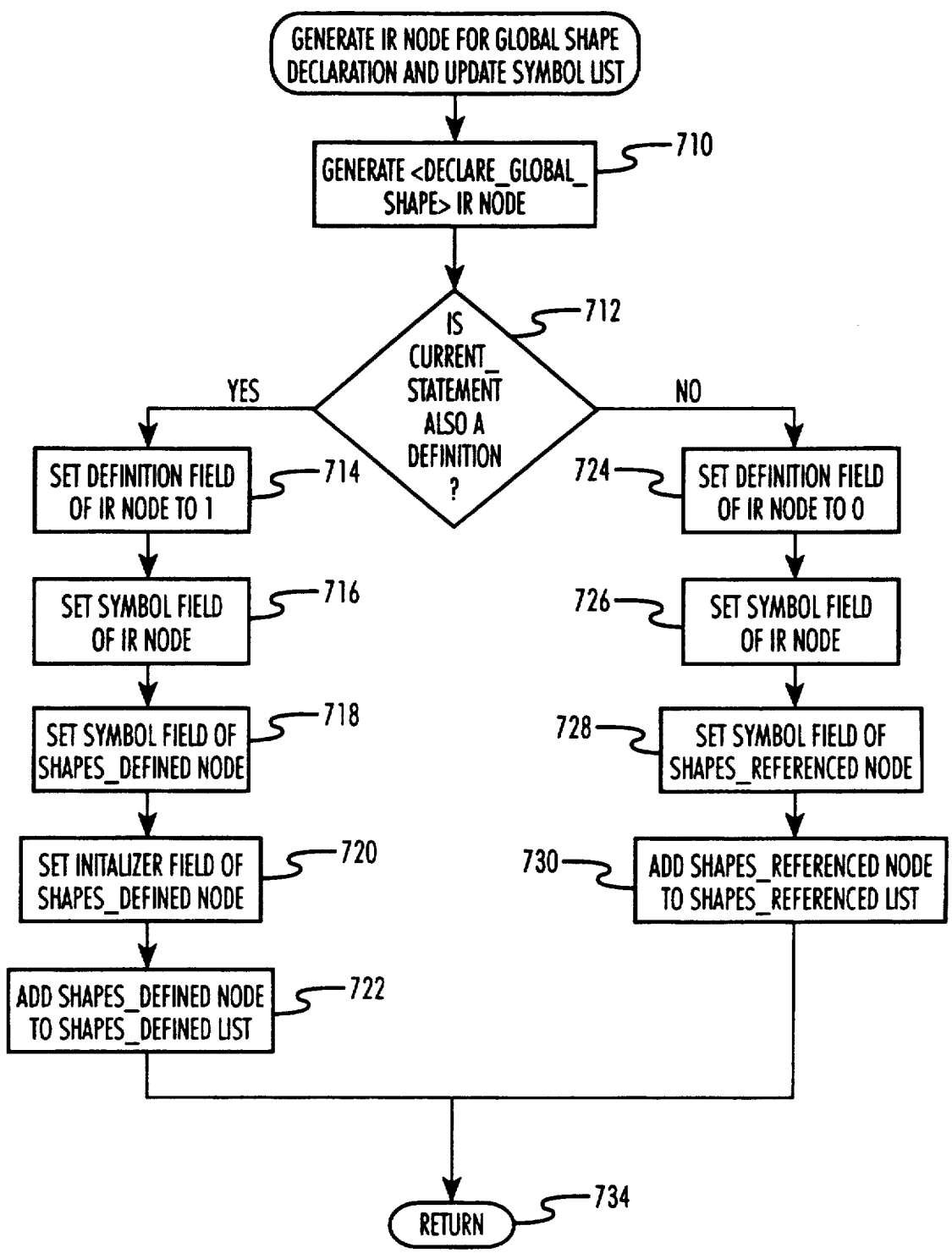

FIG. 7 is a flow chart which illustrates the operation of a global shape IR generator of FIG. 5.

Figure 8:
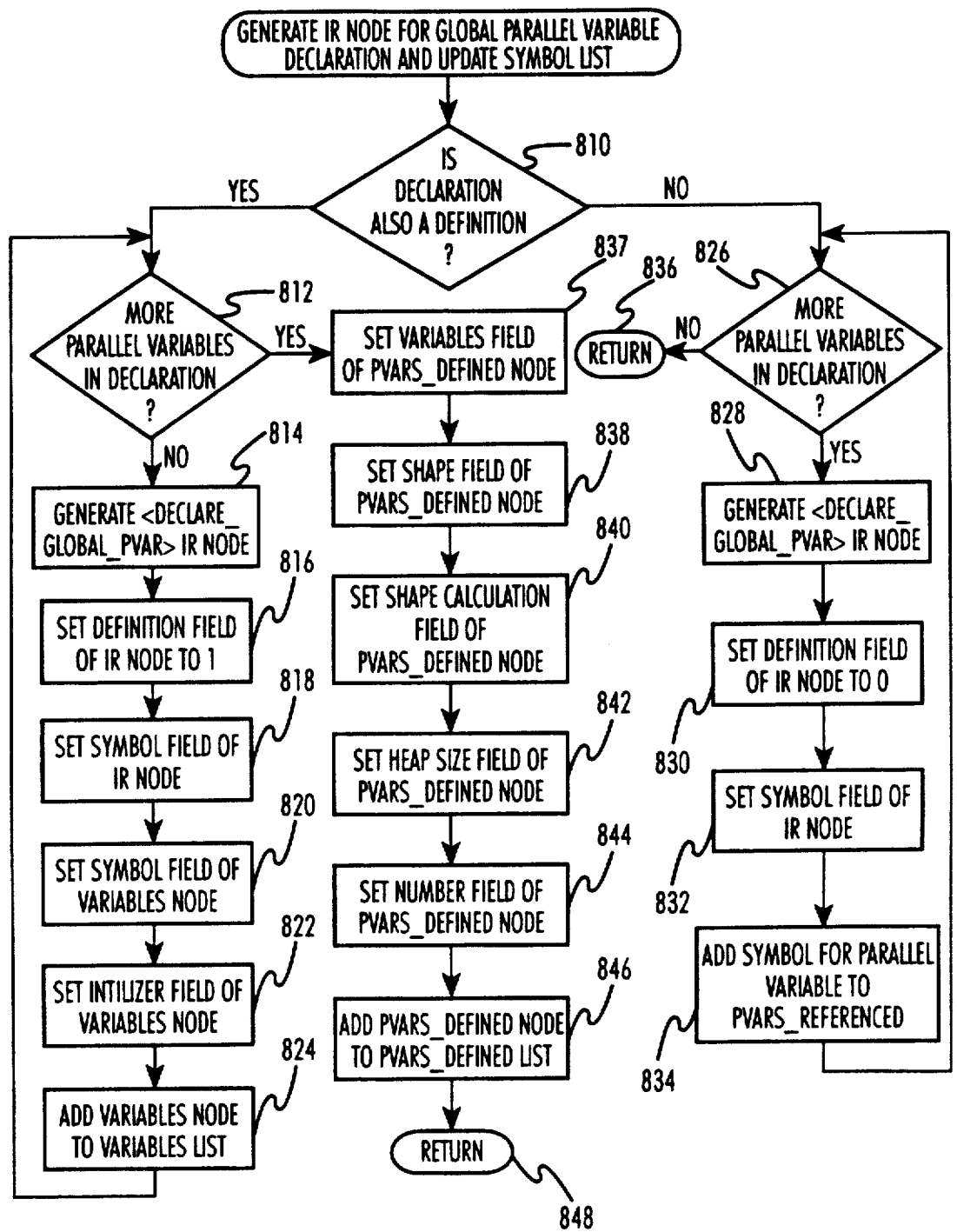

FIG. 8 is a flow chart which illustrates the operation of a global parallel variable IR generator of FIG. 5.

Figure 9:
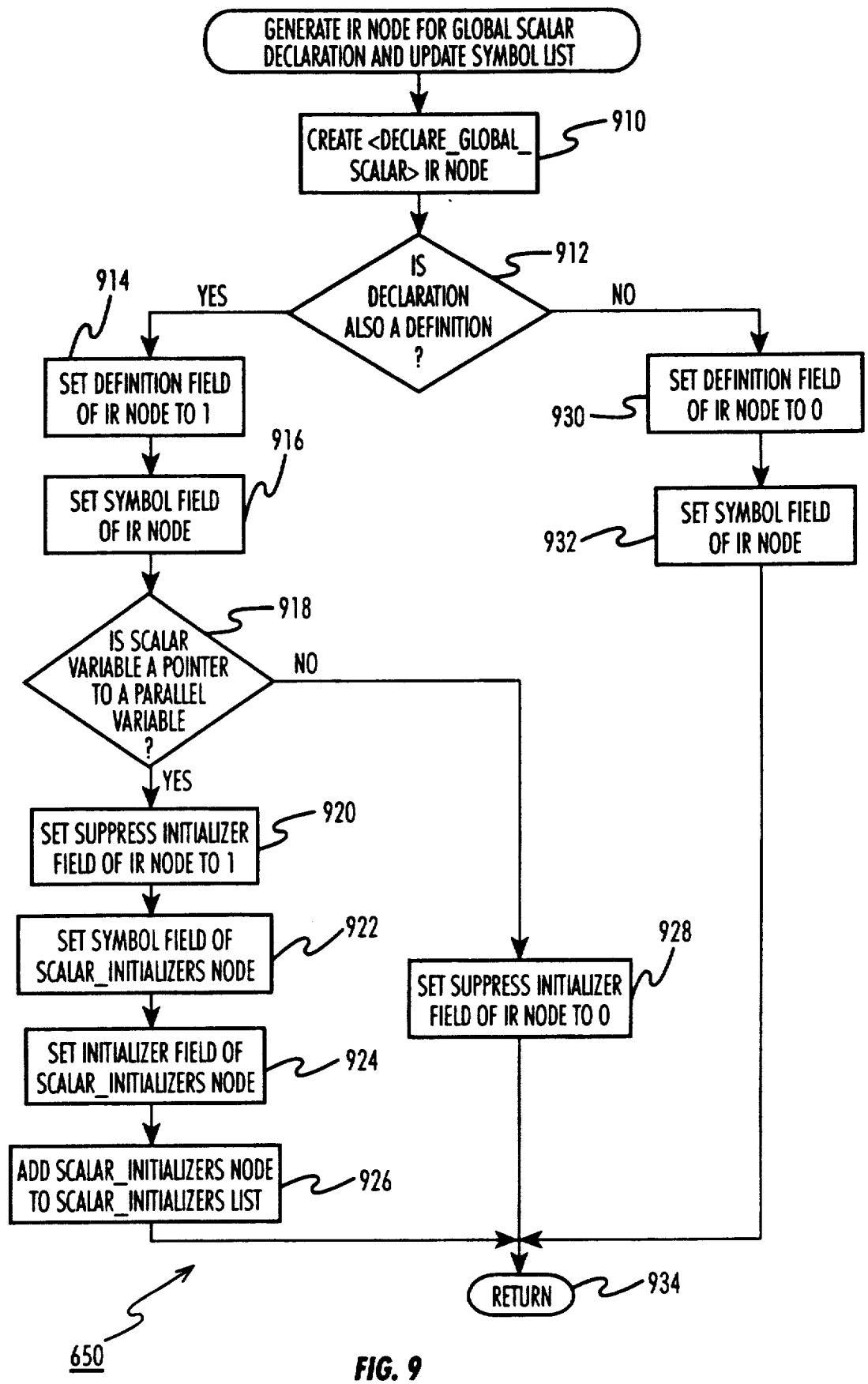

FIG. 9 is a flow chart which illustrates the operation of a scalar variable IR generator of FIG. 5.

Figure 10:
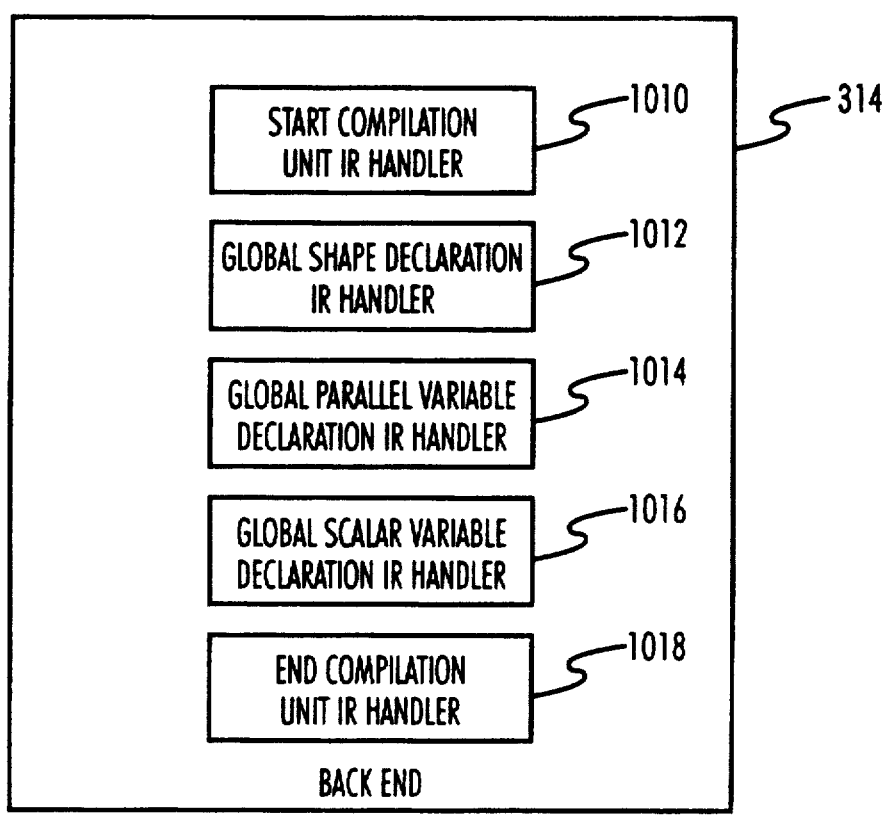

FIG. 10 is a block diagram of the structure of a back end of FIG. 3.

Figure 11A:
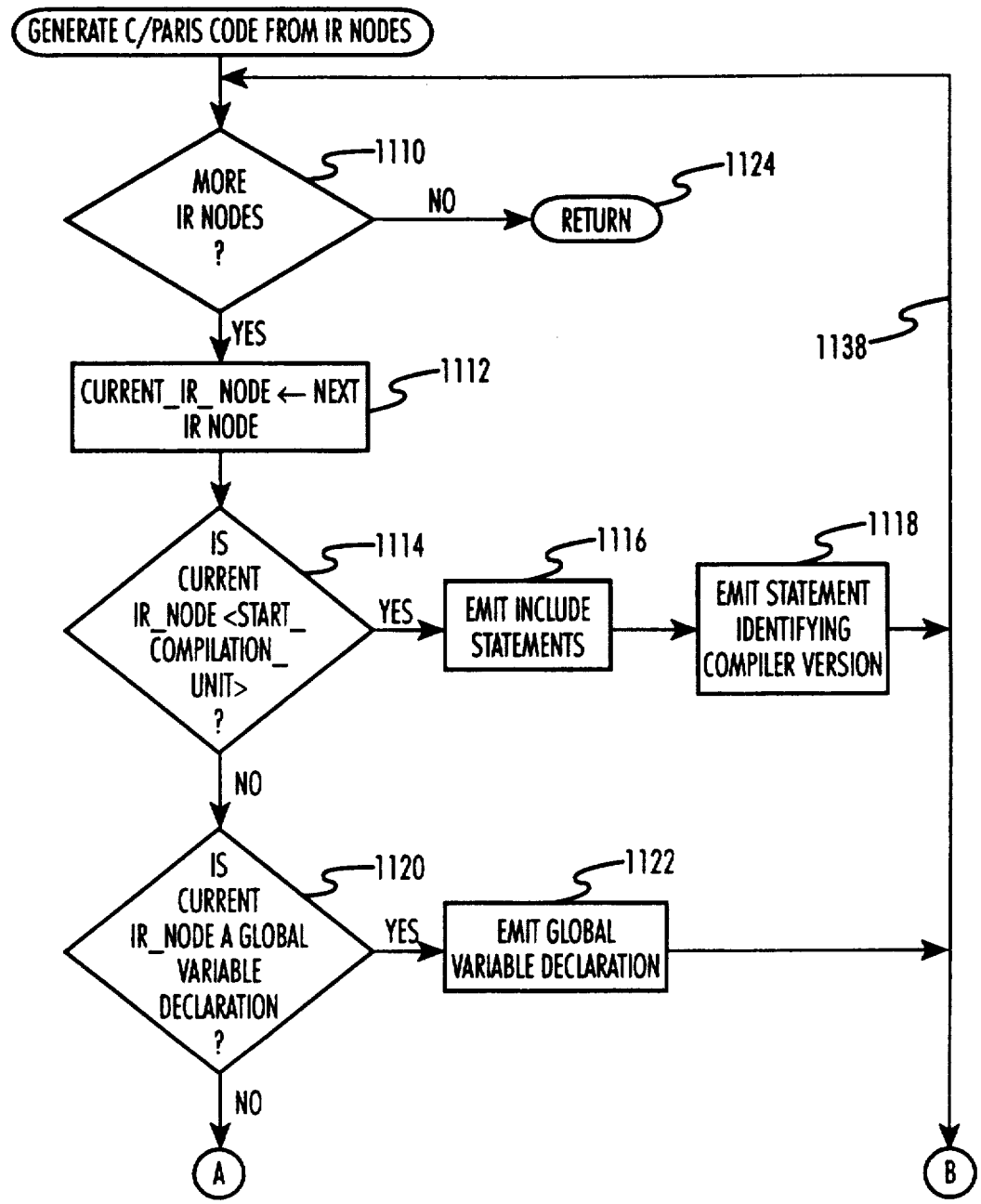
Figure 11B:
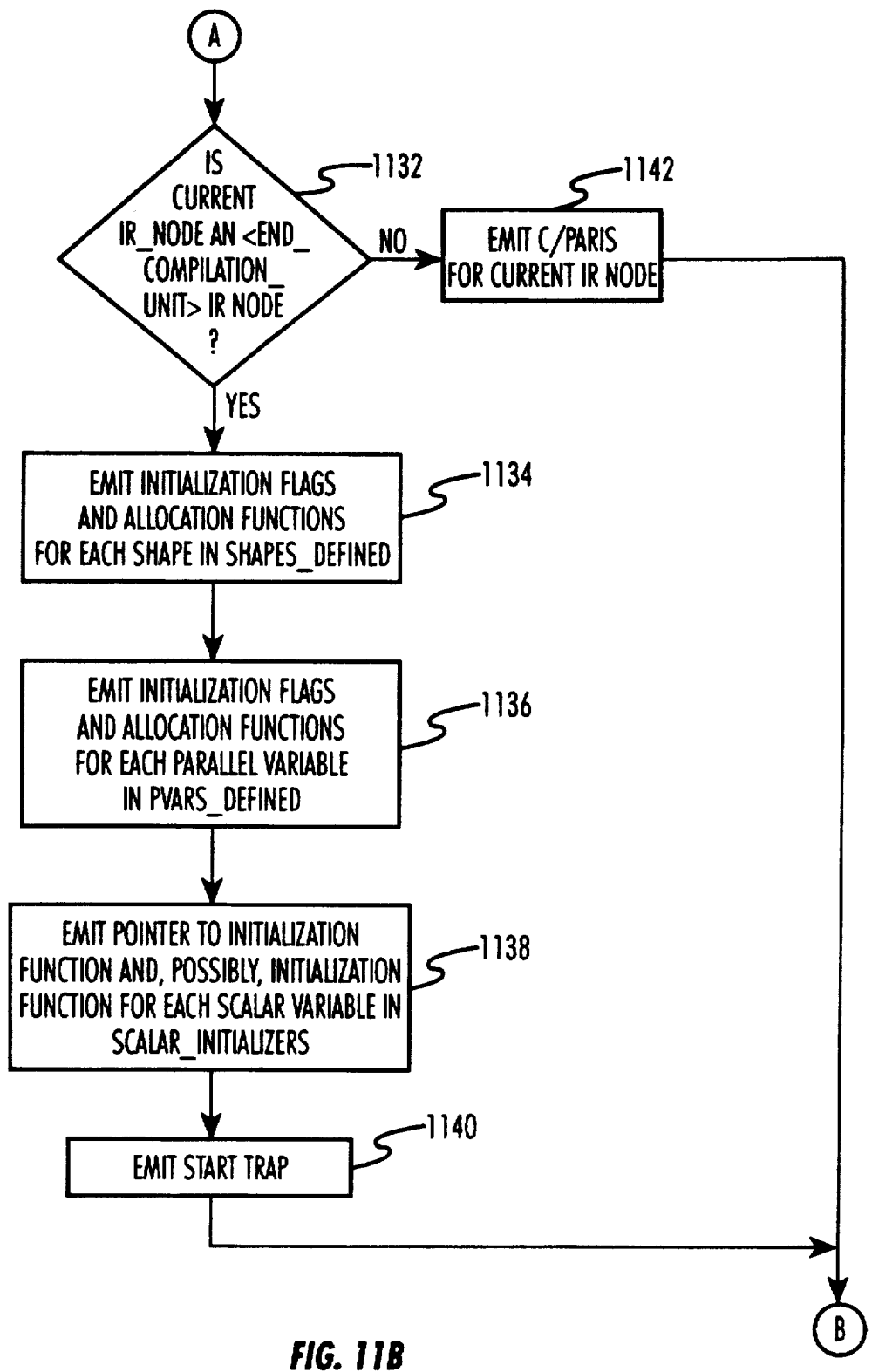

FIGS. 11A and 11B are a high-level flow chart which illustrates the operation of modules 1010, 1012, 1014, 1016 and 1018 of FIG. 10.

Figure 12A:
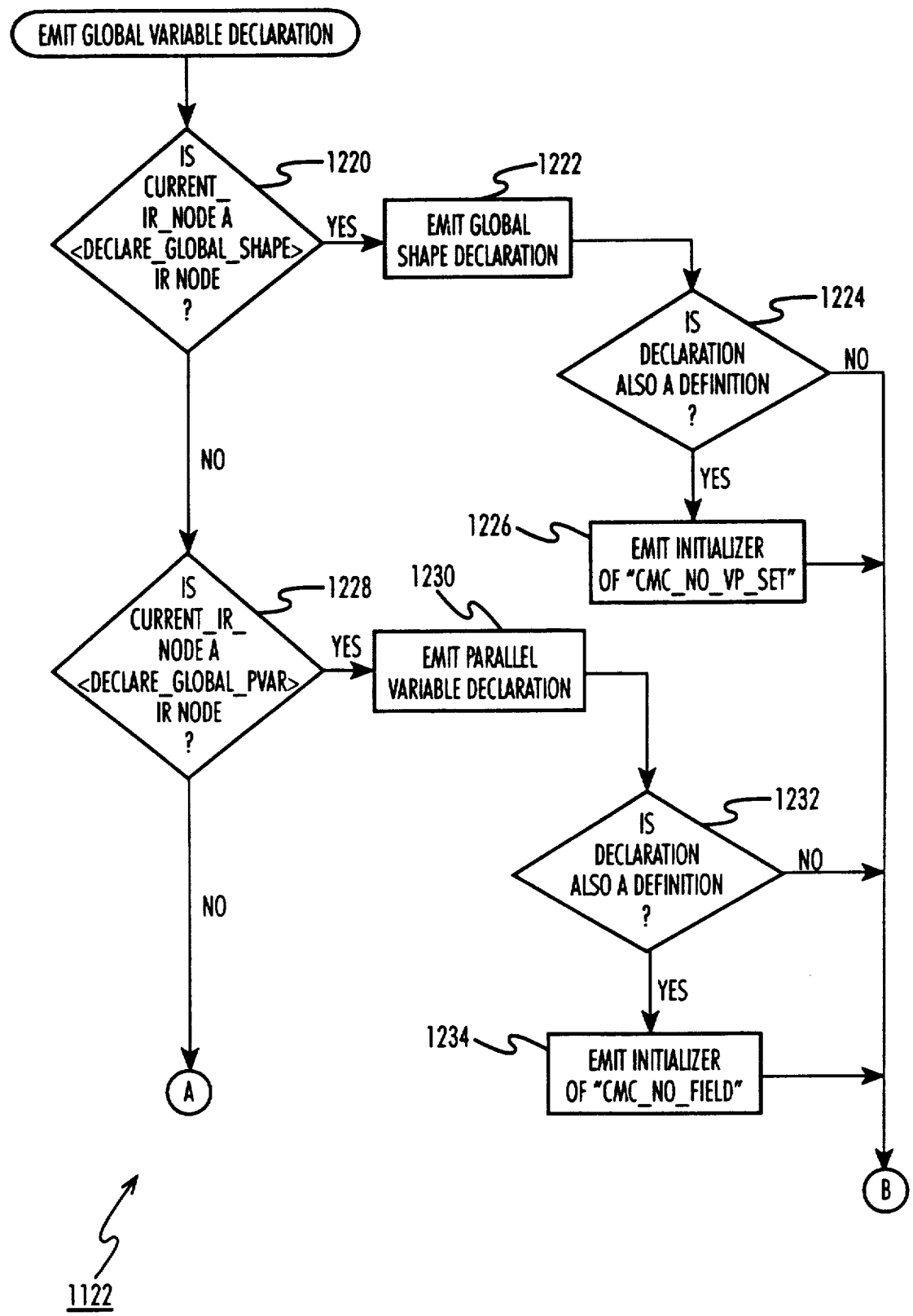
Figure 12B:
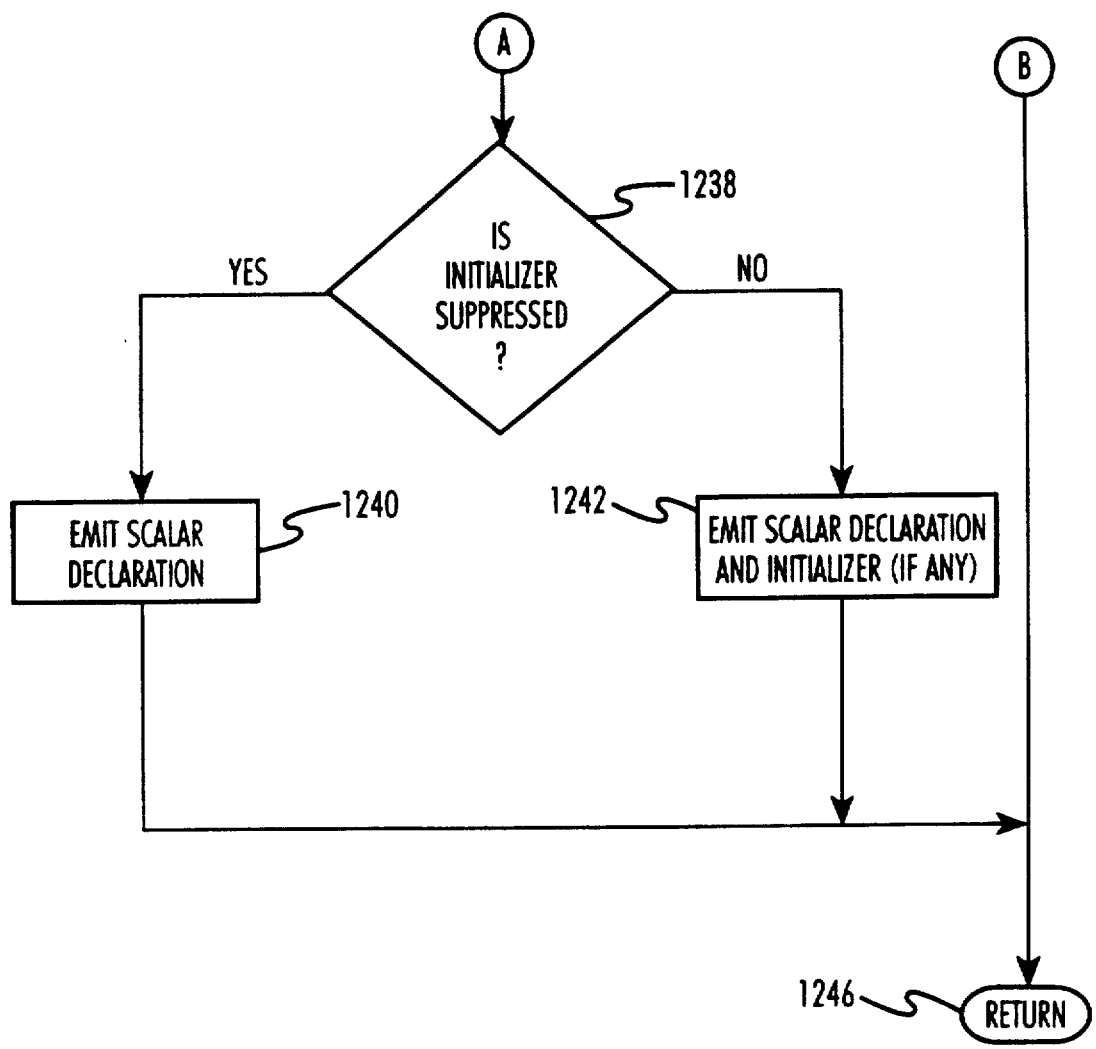

FIGS. 12A and 12B are a flow chart which illustrates the operation of modules 1012, 1014 and 1016 of the back end of FIG. 10.

Figure 13:
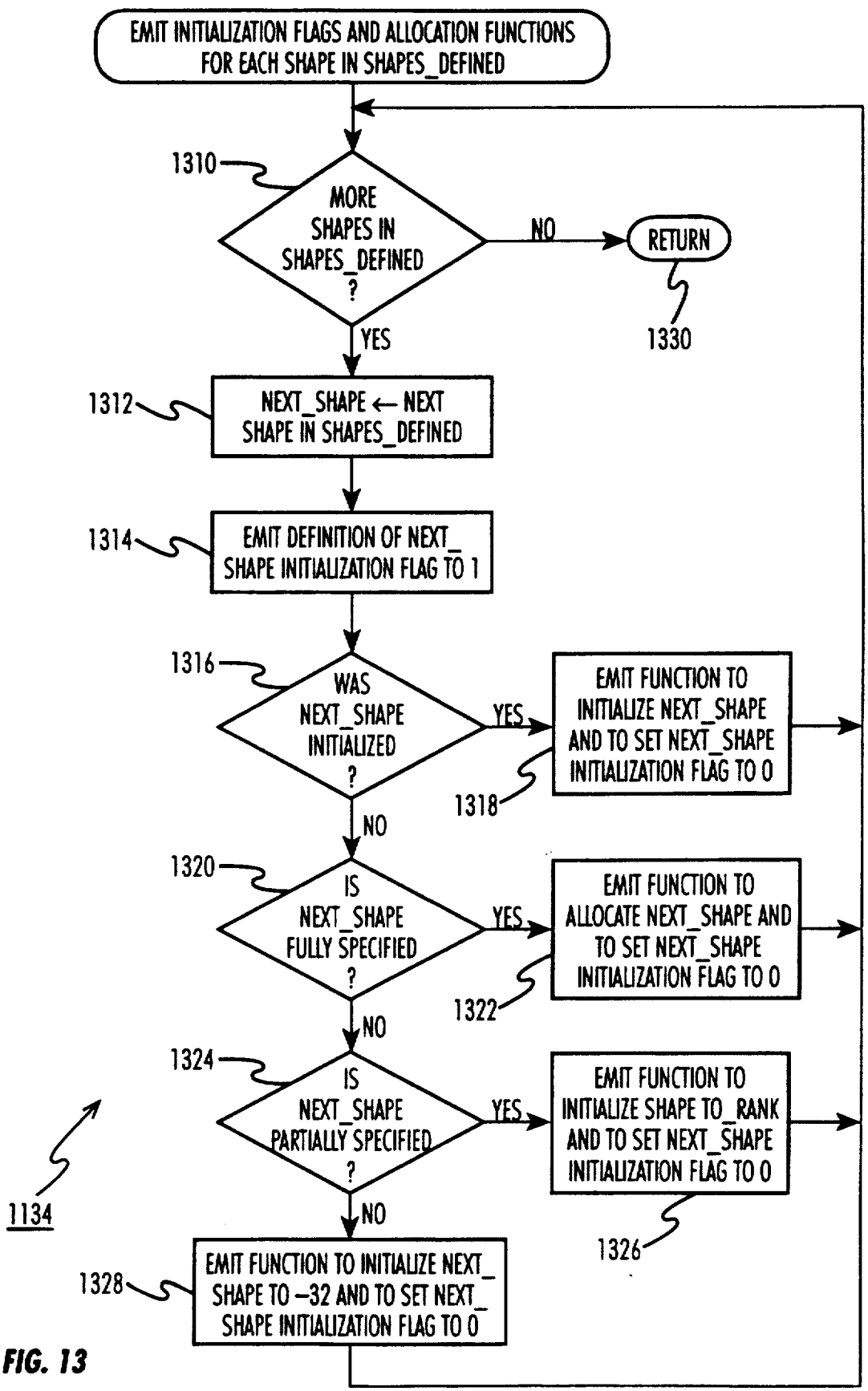

FIG. 13 is a flow chart which shows the operation of a global shape declaration IR handler of FIG. 10.

Figure 14:
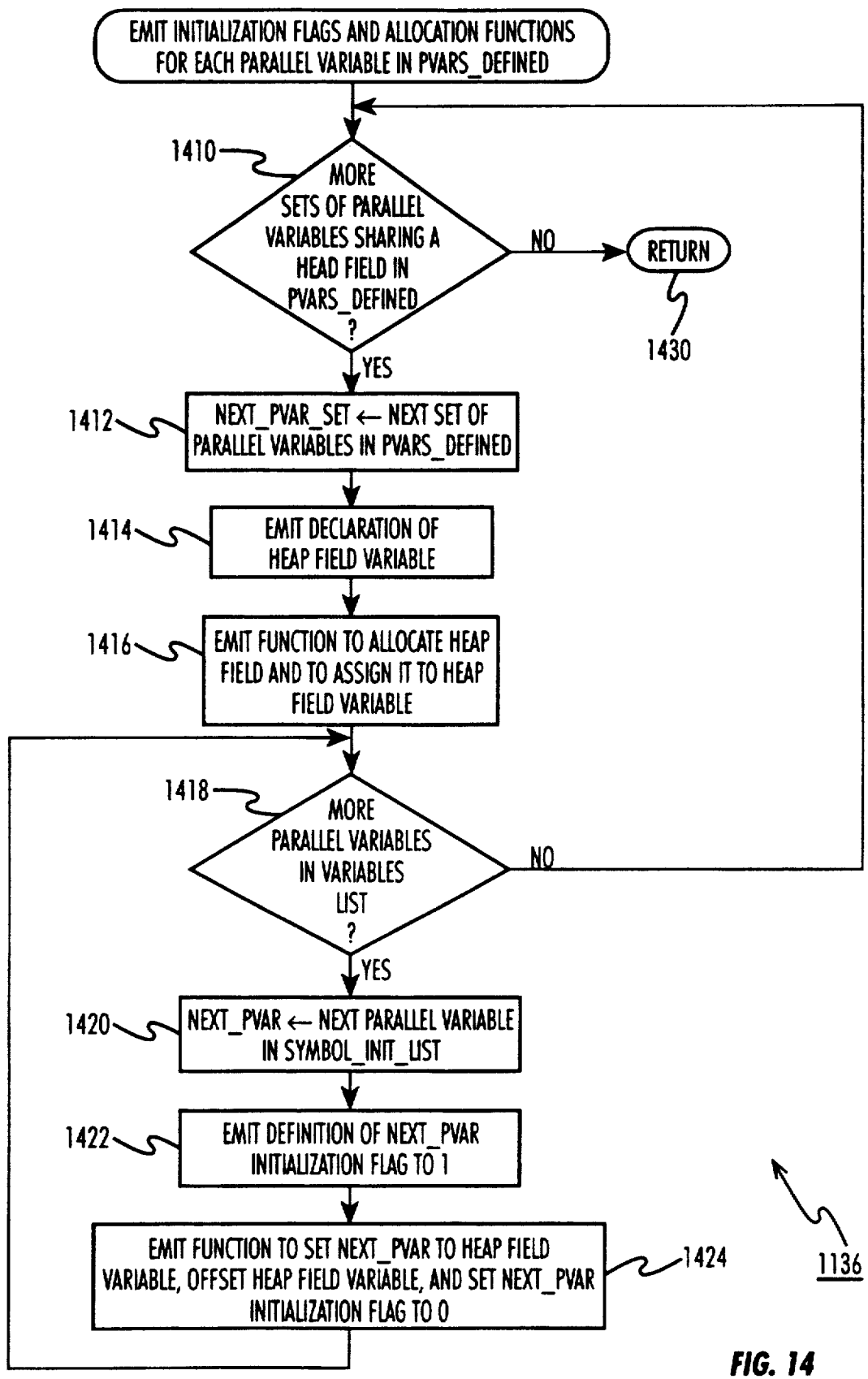

FIG. 14 is a flow chart which illustrates the operation of a global parallel variable declaration IR handler of FIG. 10.

Figure 15:
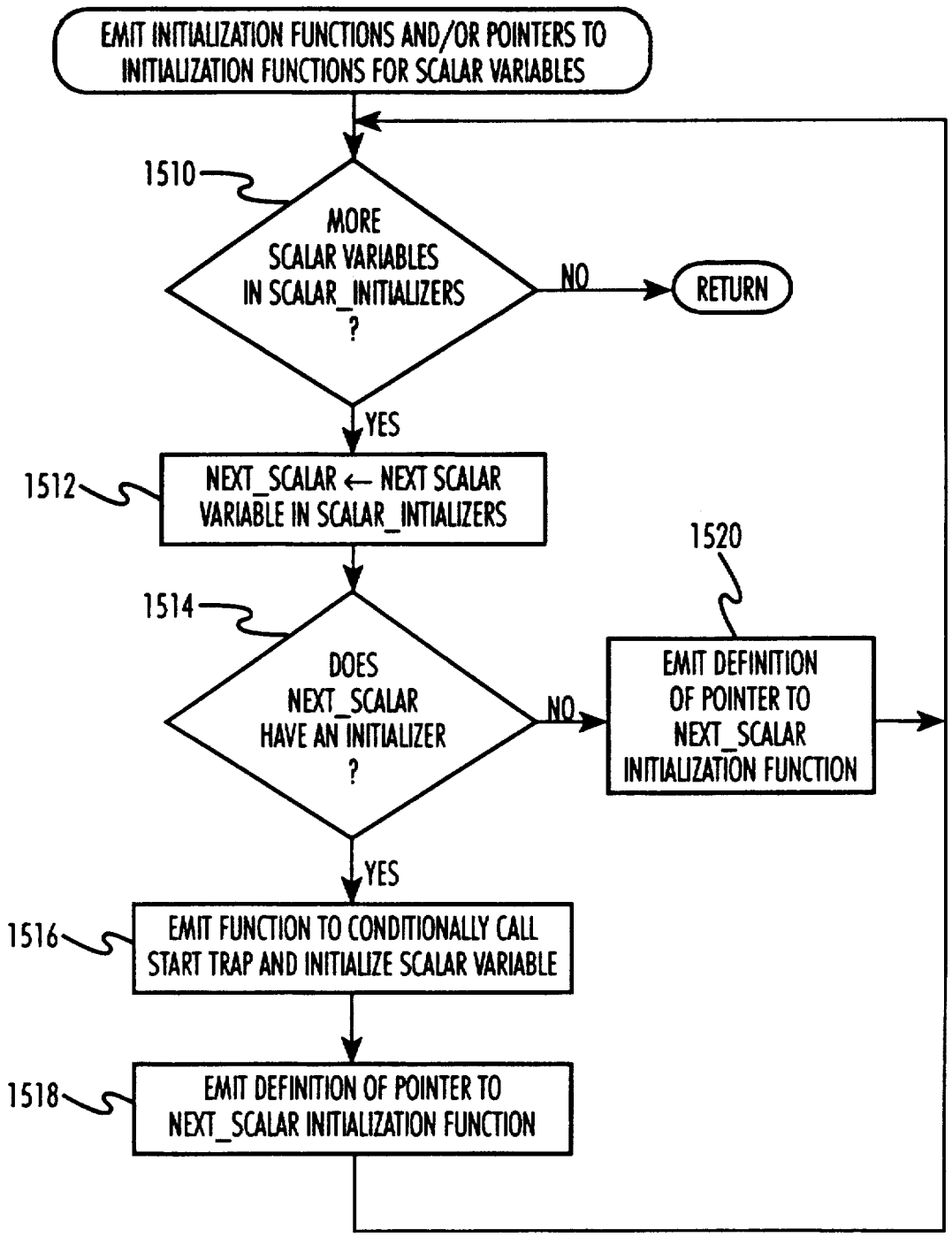

FIG. 15 is a flow chart which illustrates the operation of a global scalar variable declaration IR handler of FIG. 10.

Figure 16:
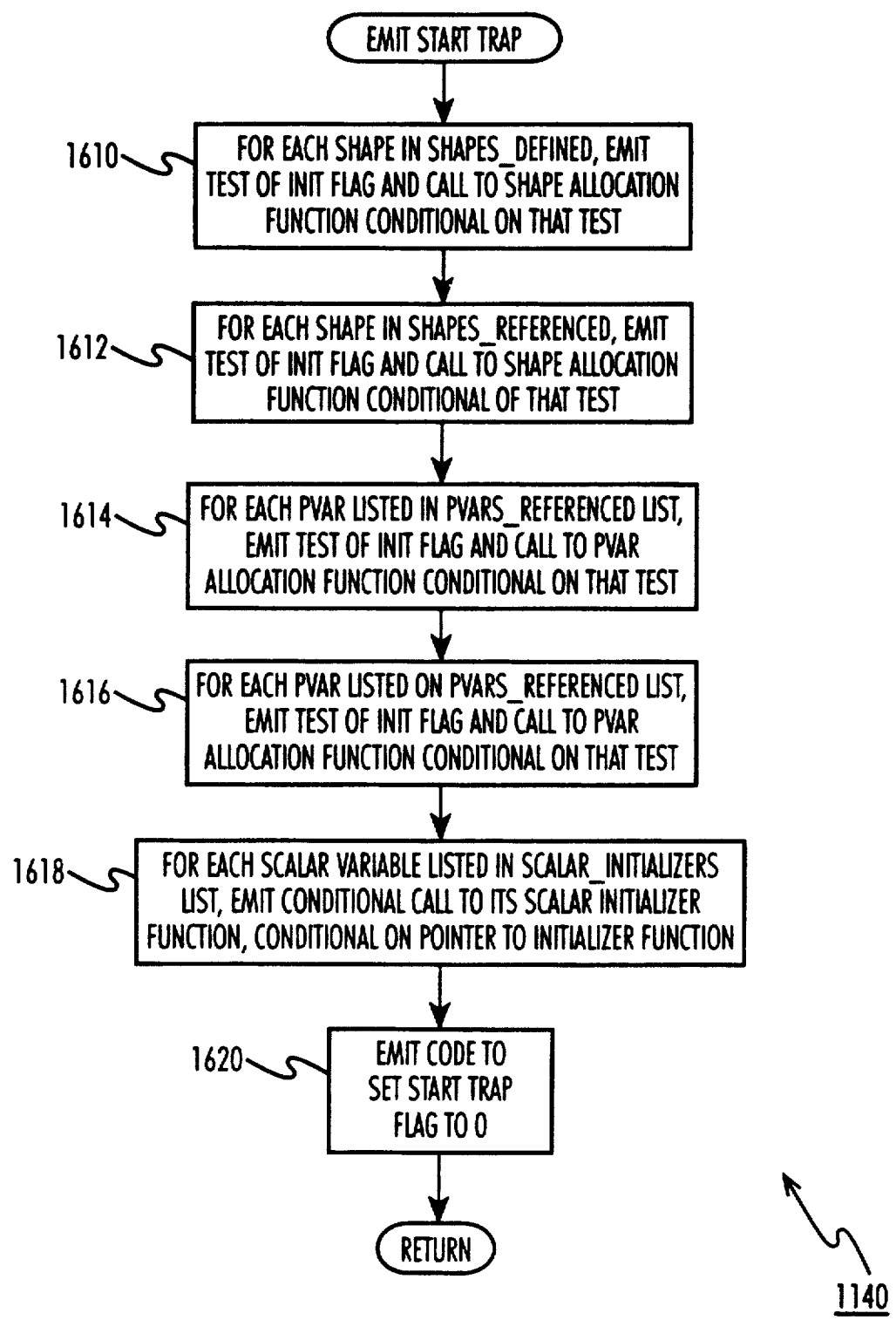

FIG. 16 is a flow chart which illustrates the operation of an end compilation unit IR handler of FIG. 10.

DETAILED DESCRIPTION OF THE PREFERRED EMBODIMENTS

1. Hardware and Software Environment of the Present Invention

The present invention is directed to a software compiler for compiling a computer program wherein the computer program is adapted for use with a data parallel computer. In this patent document, the terms "computer program" and "source code" are used interchangeably.

In a preferred environment of the present invention, the data parallel computer is one manufactured by Thinking Machines Corporation, such as the Connection Machine® Model CM1 TM, CM2 TM and CM5 TM Supercomputers. These and other preferred environments of the present invention are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer, including one embodiment of processors and router, with which the present invention can be used. U.S. Pat. No. 4,984,235 describes a massively-parallel computer, including a second embodiment of processor. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating the 2-, 3-, or higher dimensional nearest-neighbor communication network ("NEWS") between chips using the hypercube wires.

The computer program is written in a high level language (HLL). A preferred HLL is C* (pronounced "see star"). C* is based on Standard C and is extended to support parallel instructions and parallel data types. The C* language is described in detail in the Thinking Machines Corporation publications C* *Programming Guide* (Version 6.0, November 1990) and C* *Language Reference Manual* (April 1991) which are herein incorporated by reference in their entirety.

FIG. 1A shows a block diagram of the structure of a preferred environment in which the present invention could operate. A data parallel computer 110 is comprised of a plurality of parallel processors 112. The number of processors in an actual data parallel computer 110 might range from 2,048 to 65,536. For clarity, the data parallel computer 110 illustrated has only eight parallel processors 112 (parallel processor$_0$ to parallel processor$_7$). Each parallel processor 112 has a CPU 114 and a random access memory (RAM) 116.

FIG. 1A shows a block diagram representative of the structure of a preferred environment in which the present invention could operate. To facilitate explanation, a block diagram shows a simplified view of the actual structure of the preferred embodiment. A data parallel computer 110 is comprised of an array of parallel processors 112. The number of parallel processors in an actual data parallel computer 110 might range from 2,048 to 65,536, for example. For clarity, the data parallel computer 110 illustrated has only eight parallel processors 112 (parallel processor$_0$ to parallel processor$_7$).

Each parallel processor 112 has a CPU 114 and a random access memory (RAM) 116.

In the data parallel computer 110, each of the parallel processors 112 is directly connected to three other parallel processors 112 by paths. For example, the parallel processor$_0$ 112 is directly connected to the parallel processor$_2$ 112 via a path 120, the processor$_3$ 112 via a path 126, and the parallel processor$_7$ 112 via a path 142. The direct connections are such that no more than two paths need be used to send data between nearest-neighbor parallel processors 112.

The data parallel computer 110 is electrically connected to a host computer 146, to a non-volatile storage device 148, and to an input/output device 150 via a bus 152.

The host computer 146 is a serial computer such as a Sun 4 (manufactured by Sun Microsystems, Inc.) or a VAX (manufactured by Digital Equipment Corp.). The host computer 146 comprises a single host CPU (or a small number of CPUs) 148 and a RAM 150.

The environment of the present invention further includes various software modules and a firmware module. The software components include a C compiler 156, a loader/link editor 158, a C* library 160, and a Paris library 162. The software modules could reside in the RAM 150, in the non-volatile storage device 149, or in some combination of the two. In FIG. 1A, the software modules are shown in the RAM 150. The firmware module (a Paris instruction set 164) resides in a microcode 166 of the host CPU 148.

A C* compiler 154 of the present invention is also included in the RAM 150. An example of the C* compiler 154 is the Thinking Machines Corporation C* Compiler, Version 6.0.

As noted above, C* is an extension of Standard C in that C* supports parallel instructions and parallel data types. Such extension of Standard C is achieved via use of a native instruction set of the data parallel computer. One such native instruction set is a Paris language. The Paris language is a low-level instruction set for programming the data parallel computer. The Paris language is described in the Thinking Machines Corporation documents *Paris Reference Manual* (Version 6.0, February 1991) and *Revised Paris Release Notes* (Version 6.0, February 1991), which are herein incorporated by reference in their entireties. These documents are available from the Thinking Machines Corporation Customer Support Department at 245 First Street, Cambridge, Mass.

The Paris instruction set 164 and the Paris library 162 implement the Paris language. The Paris instruction set 164 and the Paris library 162 are part of the system software for the Connection Machine ® Model CM2 TM Supercomputer.

FIG. 2 is a flow chart which illustrates the relationship between the software modules 154, 156, 158, 160 and 162 and the firmware module 164 of FIG. 1A. Referring to FIG. 2, in a step 210 the C* compiler 154 generates C source code from C* source code. In a step 212, the C compiler 156 generates relocatable machine code from the C source code. In a step 214, the loader/link editor 158 links the relocatable machine code to user compilation units and to compilation units of the C* library 160 and the Paris library 162 to generate linked machine code. Steps 216, 218, and 220 involve executing the linked code. Specifically, in step 216, the relocatable addresses of the linked code are translated to absolute machine addresses. In step 218, the absolute machine code is loaded into the front end computer 146. In step 220, the absolute machine code is executed.

2. Selected Aspects of the C* Programming Language

C* uses shapes and parallel variables to extend C to support data parallel programming.

A shape is a template for parallel data. In C*, a programmer must specify the shape of the data before the programmer can define data of that shape. A shape is specified by how many dimensions it has and by the number of positions in each of its dimensions. The total number of positions in a shape is product of the number of positions in each of its dimensions. For example, an 8×4 shape has 32 positions.

A C* keyword "shape" is used to declare shapes. This is shown in Example 1, below.

shape [8]employees;

shape [4]companies;                         (Example 1)

The statements in Example 1 declare a shape called employees and a shape called companies. The employees shape has one dimension (a rank of 1) and 8 positions. The companies shape has one dimension and 4 positions.

A dimension is also referred to as an axis. A shape can have multiple axes. Each of the axes are specified in a set of brackets to the left of the shape name. For example, the following statement in Example 2 declares a two-dimensional shape:

shape [256][512]image;                      (Example 2)

The statement in Example 2 declares a shape called image. The shape image has two dimensions (a rank of 2), one of 256 positions and another of 512 positions. The left-most axis is referred to an axis 0. The next axis to the right is referred to as axis 1.

Parallel variables are similar to standard C variables. However, parallel variables have a shape in addition to their data type and storage classes. The shape defines how many elements of a parallel variable exist, and how they are organized. Each element occupies one position within the shape and contains a single value. If a shape has 16384 positions, for example, a parallel variable of that shape has 16384 elements—one for each position.

Parallel variables are declared as shown in Example 3.

char:employees employee__id;

int:companies company__id;                  (Example 3)

Each element of a parallel variable can be thought of as a single scalar variable. But a C* program can also carry out operations on all elements (or any subset of the elements) of a parallel variable at the same time. Operations which operate on parallel variables are called parallel operations.

Once a parallel variable has been declared, left indexing may be used to specify an individual element of it. For example, [2]employee__id refers to the third element of employee__id. [2] is called the coordinate for this element.

Figure 1B:
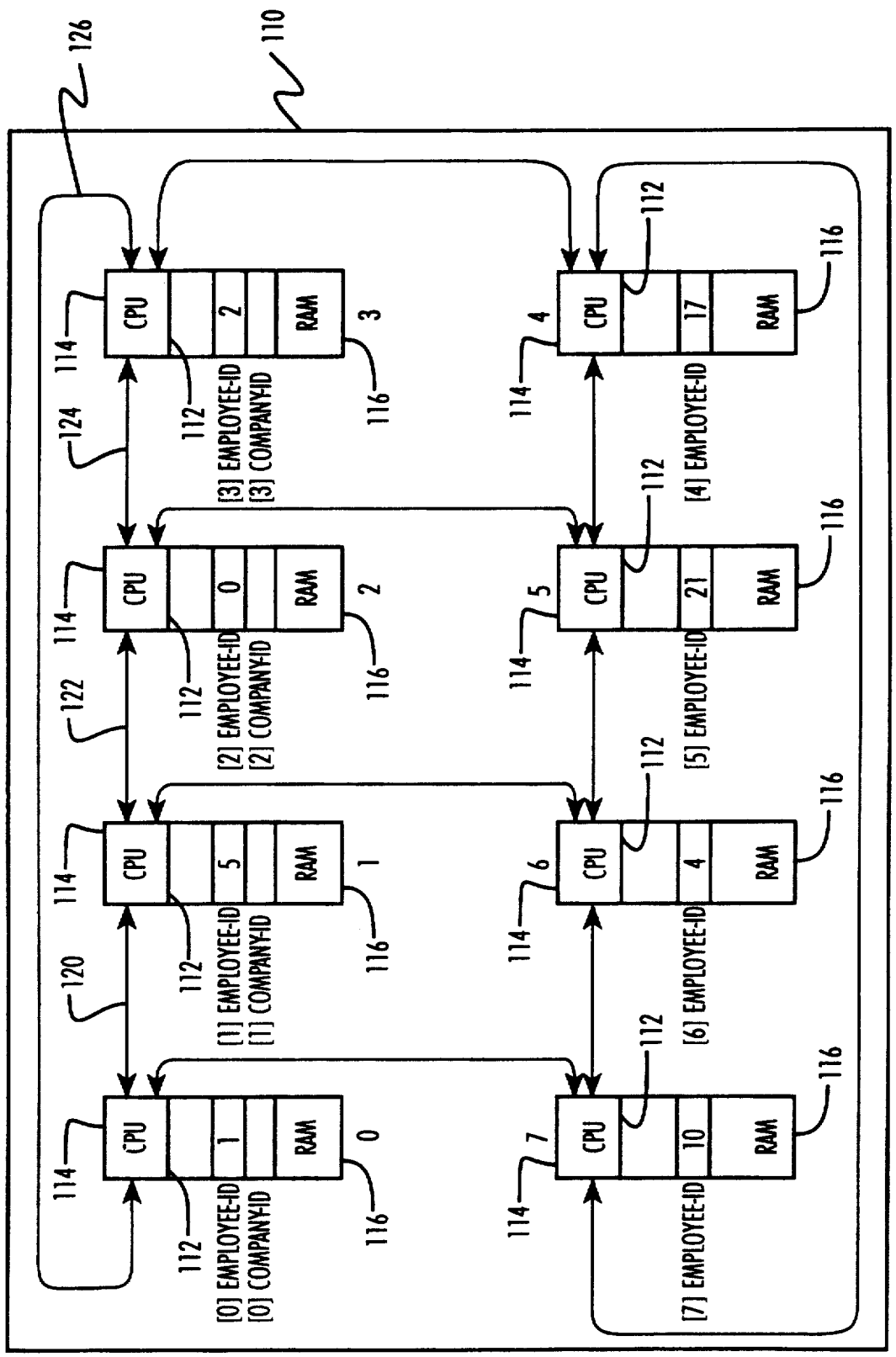
FIG. 1B illustrates a data parallel computer.

Elements of parallel variables are mapped to physical processors. This is illustrated in FIG. 1B. FIG. 1B illustrates the data parallel computer 110 in greater detail.

As shown in FIG. 1B, the first element of employee_id is stored in the RAM 116 of processor 0. The second element of employee_id is stored in the RAM 116 of processor 1. Similarly, the third, forth, fifth, sixth, seventh, and eight elements of employee_id are stored in the RAMs 116 of the processors 2, 3, 4, 5, 6 and 7, respectively.

In a similar manner, the elements of the parallel variable company_id are stored in the processors 0, 1, 2 and 3.

Before a parallel operation may be executed on a parallel variable, the current shape must be set to the shape of the parallel variable. The current shape may be set by using the C* "with" statement. For example, to operate with parallel variables of shape employees (such as employee_id), the C* statements in Code Segment 1 may be used.

```
with(employees) {
/*operations on parallel variables of
shape employees go here*/
};
    Code Segment 1
```

Within the "with" statement of Code Segment 1, parallel operations may be performed on parallel variables of shape employees. However, parallel operations may not be performed on parallel variables (such as company_id), having other shapes (such as companies).

The pre-declared shape name "current" always equates to the current shape; "current" is a new keyword that C* adds to Standard C. A parallel variable can be declared with "current" as follows:

int:current variable1;

If employees had been set as the current shape when the above statement executed, variable1 would be of shape employees.

The pre-declared shape name "physical" is always of rank 1. Its number of positions is the number of parallel processors 112 on the data parallel computer 110 on which the program is running. Note, therefore, that the number of positions in the shape is not known until run time. As with "current", "physical", is a new keyword that C* adds to Standard C. A parallel variable can be declared with "current" as follows:

int:physical variable2;

If the data parallel computer 110 on which the program with the above statement executes has 32,768 parallel processors 112, then variable2 would have a rank of 1 and 32,768 positions.

3. Overview of the C* Compiler

The general operation of the C* compiler is similar to the operation of conventional compilers. Such operation of conventional compilers are well known and are described in many publicly available documents, such as *Compilers, Principles, Techniques, and Tools* by Aho, Sethi, and Ullman (Addison-Wesley Publishing Company, Reading Mass., 1988), which is herein incorporated by reference in its entirety.

As noted above, however, the C* source code 308 may include instructions involving parallel variables. The compilation of such parallel instructions are not well known. In compiling the C* source code 308, the C* compiler 154 replaces these parallel instructions with calls to functions in the Paris library 162.

FIG. 3 is a high-level block diagram of the structure of the C* compiler 154 of FIG. 1. As FIG. 3 shows, the C* compiler 154 is essentially comprised of a front end 310, a middle end 312, a back end 314, an optimizer 316, an error handler 318 and a pretty printer 320.

FIG. 4 is a flow chart which shows how the modules of FIG. 3 carry out the step 210 of FIG. 2 of generating C/Paris code from C* source code. Looking FIG. 4, in a step 410 the front end 310 constructs the parse tree 322 in the symbol table 324 from the C* source code 308. The symbol table 324 is made up of entries for variable and function declarations in the C* source code 308. The symbol table entries contain information on, for example, the identifier, type, (including parallel attributes) and scope of functions and variables. The manner by which the front end 310 carries out the step 410 is described in greater detail in the pending patent application entitled, "A Compiler For Parallel Communication Instructions".

In a step 412, the middle end 312 consults the parse tree 322 and the symbol table 324 to generate the IR tree 326. The structure of the middle end and the manner by which the modules of the middle end carry out the step 412 are described in greater detail in FIGS. 5-9 and the accompanying text.

In a step 414, the optimizer 316 optimizes the IR tree 326. Specifically, the optimizer receives unoptimized IR nodes 328 of the IR tree 326 and replaces them with optimized IR nodes 330. The structure of the optimizer 316 and the manner by which the modules of the optimizer carry out the step 414 are described in greater detail in the above-cited pending patent applications entitled "Compiler For Parallel Communication Instructions" and "System And Method For Optimizing Parallel Variables".

In a step 416, the back end 314 consults the IR tree 326 to generate C/Paris code 332. The structure of the back end 314 and the manner by which the back end 314 carries out the step 416 are described in greater detail in FIGS. 10-16 and the accompanying text.

In the front end 310, the middle end 312, the optimizer 316 or the back end 314 detect errors in the C* source code 308, parse tree 322, symbol table 324 or the IR tree 326, the modules invoke the error handler 318 to generate appropriate error message.

4. Overview Of Global Run-Time Variable Processing a. Declarations and Definitions At compile time, a loader/link editor links references and declarations for, allocates memory for, and initializes global scalar variables. Linkage of references and declarations for parallel values and shapes, memory allocation for parallel values and shapes, and initialization of pointers to parallel values must be carried out at run time. Accordingly, the C* compiler 154 of the present invention generates C/Paris code to explicitly perform such linkage, allocation and initialization at runtime. It does so for global run-time variables essentially as follows. (A global variable is a variable which is declared at file scope or which has external linkage.)

In order to be compatible with Standard C compilers, the C* compiler 154 emits an explicit initializer on shapes and parallel variable declarations that correspond to C* definitions. The value of the initializer is irrelevant; its purpose is only to guarantee that the C/Paris code will have exactly one definition for the run-time variable.

For a shape, the C* compiler 154 declares variable of type "CMC_shape_t" and assigns to it a virtual processor (VP) set. A VP set is the set of virtual processors to which the positions of the shape map. If the number of positions in the shape is less than or equal to the number of parallel processors 112 in the data parallel computer 110, then each virtual processor of the virtual processors set is associated with one of the parallel processors 112. Otherwise, the RAM 112 of each of the parallel processors 112 is divided up so that each of the parallel processors 112 is associated with more than one virtual processor.

For an array of shapes, the C* compiler 154 declares an array of type "CMC_shape_t" and assigns to each array element a VP set.

The C* compiler 154 generates a C/Paris declaration for a shape or an array of shapes which is similar to that of the C* declarator. However, the C/Paris declarator has no left indices and, if the C* declarator was a definition, then the C/Paris declarator includes an initializer of "CMC_no_vp_set". For example, for the following C* declarations:

```
shape S[10][5];

shape [100]T;
``` the C* compiler 154 generates the following the C/Paris code:

```
CMC_shape_t S[10][5]=CMC_no_vp_set;

CMC_shape_t T=CMC_no_vp_set;
```

For a parallel variable declaration, the C* compiler 154 generates a run-time variable of type "CMC_pvar_t" and, if it is a definition, initializes it to a field called "CMC_no_field". A field is the data structure associated with an element of a parallel variable. The C* compiler 154 generates a declaration for a parallel variable which is similar to the C* declarator for the parallel variable. For example, the following declaration in a C* program:

```
int: S i;
``` will become the following in the C/Paris code:

```
CMC_Pvar_t i=CMC_no_field;
```

In order to give pvars and shapes the linkage and extent intended by the programmer, the C/Paris code run-time variable declarations generated by the C* compiler 154 run-time variable declarations have any storage class specifier found on the C* declaration. Note that this applies only to extern and static, since they are the only ones that are legal at file scope.

b. Allocation Functions

Many compilation units may reference a variable but only one may define it, according to the rules of C*. This is true for both parallel variables and shapes (as well as scalars). This fact simplifies the allocation problem somewhat. For each definition of a shape or parallel variable in the compilation unit, the C* compiler 154 emits a function with the name "CMC_alloc_p," where p is the name of the shape or parallel variable. This function's purpose is to allocate a VP set or VP sets (if p is a shape or array of shapes, respectively) or a field (if p is a pvar). In addition to the allocation function, the compiler also emits an initialization flag. The initialization flag is used at run time to keep track of whether its allocation function has been called. It is initialized to one with an initializer.

The C* compiler 154 emits C/Paris code to allocate shapes as follows. If the shape or array of shapes is specified, the shape allocation function calls a C* library 160 routine called "CMC_allocate_shape" the appropriate number of times with the appropriate arguments and assigns the vp set id(s) returned by the routine to the shape's run-time variable. A shape is specified if its declaration specifies its rank and dimensions. A shape is unspecified if its declaration specifies neither its rank nor its dimensions. A shape is partially specified if its declaration specifies its rank but not its dimensions.

If the shape or array of shapes is partially specified or unspecified and has an initializer, the shape allocation function contains assignment statements to implement the initializer. (Note: in the case of a partially specified shape or array of shapes with an initializer, the front end will 310 verify that the rank of the shape is the same as that of the shape allocated by the initializer. Therefore the C* compiler 154 does not emit code to check this at run time.) If the shape or array of shapes is partially specified and there is not initializer, the run-time variable is initialized with -d (or with an aggregate initializer of N -d's, if it is an array of N shapes), where d is the rank of the shape. If the shape or array of shapes is unspecified and there is no initializer, the run-time variable is initialized with -32 (or with an aggregate initializer of N -32's, if it is an array of N shapes). (The maximum rank of a C* shape is 31). These negative values allow for run-time safety level checking during assignments to shape run-time variables. The C* compiler 154 emits a statement to set the initialization flag to zero after the shape allocation function.

If a shape or array of shapes is declared in the C* program to be static, the C* compiler 154 will emit the allocation function and initialization flag as static.

There are several approaches by which the C* compiler 154 could generate C/Paris code for parallel variable allocation functions. The first approach has the advantage of being relatively easy to implement. According to the first approach, each parallel variable allocation function comprises C/Paris code to allocate a field from a heap and assigns it to the parallel variable being allocated. Heap field allocation could be by a routine of the Paris library 162 called "CM_allocate_heap_field_vp_set". This routine is described in greater detail in the above-cited document entitled *Paris Reference Manual*.

A second approach by which the C* compiler 154 could generate C/Paris code for parallel variable allocation functions has the advantage of higher performance at run-time. According to the second approach, where possible, groups of parallel variables share heap fields. The C* compiler 154 generates code to invoke a heap field allocation function to allocate a single heap field for a group of parallel variables, and to assign the location of the heap field to a global variable. Each parallel variable allocation function generated by the C* compiler 154 comprises C/Paris code to assign the appropriate portion of a heap field to its parallel variable. If necessary, the parallel variable allocation function additionally contains code to first call the heap field allocation function. Additionally, a parallel variable allocation function contains code to initialize its parallel variable to zero if there was no explicit initializer in the C* program, or to the explicit initializer if there was one. Finally, it contains code to set its initialization flag to zero so that it will not be called more than once. If the parallel variable is declared to be static, then the parallel variable allocation function and the initialization flag will also be static.

In the second approach, the C* compiler 154 must determine how to group the parallel variables among heap fields. It could do so by assigning a heap field to all parallel variables declared in the same C* statement. For example, in the C* statement:

int: S i,j,k;

the C* compiler 154 could allocate a single heap field to i, j and k. Alternatively, the C* compiler 154 could allocate a single heap field to all parallel variables which are declared at the same scope and of lexically identical shapes. For example, for the C* statement:

int: S l;

int: S m;

the C* compiler 154 could allocate a single heap field to l and m. Finally, the C* compiler 154 could allocate a single heap field to parallel variables declared at the same scope and of equivalent shapes. For example, for the C* statements:
shape S[2] = {allocate_shape(1,100),
  allocate_shape(1,500)};

int:S[1+0]p;

int:S[0+1]q;

the C* compiler 154 could allocate p and q to a single heap field.

Because of the complications introduced by non-simple shapes, it is difficult to concoct names for heap field allocation functions and their accompanying field id variables based on the name of the shape. Instead, the C* compiler 154 assigns numbers, so that heap field allocation functions are named "CMC_alloc_hf_number" and field id variables are named "CMC_hf_number". Both are declared as static. This is a necessity since two or more compilation units can have a function named CMC_alloc_hf_0, for example. This is not a problem, since heap field allocation functions are called only from the parallel variables allocation functions that exist in their compilation unit.

c. Scalar Initializer Functions

Most scalar declarations do not require any special attention from the C* compiler 154 and can simply be passed through to the C compiler 154. However, certain initializers on scalar pointers to parallel data require special treatment. This class of initializers is: &i, &i+-constant, &i+constant, &a[constant], &a[constant]+-constant, and &a[constant]−constant. In the following example, &i is used as the initializer, but the issues are the same for the other forms.

```
int:S i;
int:S *p = &i;        /* scalar pointer to parallel int */
```

Passing this particular form of scalar declaration straight through to the C compiler will produce the wrong result, because of the C* convention for handling pointers to parallel variables:

```
CMC_pvar_t i;
CMC_pvar_t p = &i;          /* WRONG */
Conceptually, what is desired is:
CMC_pvar_t i;
CMC_pvar_t p = i;           /* NOT p = &i */
```

But this implementation is wrong for two reasons. First, the code emitted is syntactically incorrect. Second, i would get its value through the execution of its allocation function, which cannot have been executed at the time the C compiler 156 initializes p. This implementation would give p a value of 0. But p should be assigned the value of i after its allocation function has executed.

For each defining declaration of either a scalar pointer to parallel variable, an array of scalar pointers to parallel variables, or a struct containing a member field of type scalar pointer to parallel variables, if the scalar pointer to parallel variables has an initializer, the C* compiler 154 emits C/Paris code for a scalar initializer function called "CMC_alloc_p", where p is the name of the variable declared. The scalar initializer function essentially implements the initializer, but compensates for the C* convention for handling pointers to parallel variables. For example, the scalar initializer function for the above example would simply assign i to p. The scalar initializer function's first step, however, is to call the start trap if it has not already been called. This is necessary when the scalar initializer is called from outside the compilation unit. The local start trap must run in order to allocate the variable that is being used to initialize the scalar (i, in the above example). Of course, running the start trap will have the side effect of allocating everything for the associated compilation unit. The storage class of the scalar initializer function will be that of the variable.

For any compilation unit with a referencing declaration of a scalar pointer to a parallel variable, or with a defining declaration that does not have an initializer, the C* compiler 154 must generate C/Paris code to declare a pointer to the function. The pointer is called CMC_alloc_p_ptr, where p is the name of the variable being initialized. For any compilation unit with a defining declaration of a scalar pointer to a parallel variable with an initializer, the C* compiler 154 must also generate C/Paris code to declare CMC_alloc_p_ptr and also to initialize it to point to the scalar initializer function. The start trap for a compilation unit must test each pointer to a scalar initializer function, and if it is non-zero, call the function to which it points. The storage class on the pointer will be that of the scalar variable.

d. Start trap

At the end of the C/Paris code for a compilation unit, the C* compiler 154 emits C/Paris code for a start trap. The purpose of the start trap is (1) to call a C* library 160 routine called "CMC_init" to initialize the data parallel computer 110, (2) call allocation functions for all shapes and parallel variables that are defined or referenced in the compilation unit, and (3) call scalar initializer functions. The calls to allocation and initialization functions are conditional on the respective initialization flags, so that no function is called more than once. Note that, in the case of a definition, the allocation function will be local to the compilation unit, and in the case of a reference, the allocation function may be in some other compilation unit. The start trap function is named "CMC_start_trap" and is static to the compilation unit.

The start trap's initialization flag is called "CMC_call_start_trap". It is declared to be static with an initializer of one, and it is set to zero as the first step of the start trap.

To ensure that shapes and parallel variables are allocated before they are needed by any code in the compilation unit, the C* compiler 154 emits a call to the start trap as the first step in each function in the compilation unit. Each such call is conditioned on the flag CMC_call_start_trap.

Note that it is not sufficient to call the start trap only from non-static functions, since they are not the only entry points to the compilation unit. This is demonstrated by the following example.

```
(compilation unit 1)
extern int (*f)();
main()
{
    (*f)();
}
(compilation unit 2)
static int g()
{
    ...
}
int (*f)() = g;
```

5. Parse Tree Generation a. Overview

FIG. 5 is a block diagram of the detailed structure of the middle end 312 of FIG. 3. Specifically, FIG. 5 shows the modules of the middle end 312 which generate IR nodes of the IR tree 326 for global run time variables. Note that the middle end 312 has additional modules which are not part of the present invention, and thus are not shown in FIG. 5. Looking at FIG. 5, the modules are a parse tree traverser 510, a global shape IR generator 512, a global parallel variable IR generator 514, a global scalar IR generator 516, an end compilation unit IR generator 518, an executable IR generator 520, a declaration recorder 522 and a close scope IR generator 524.

The method by which the modules of the middle end 312 carry out the step 412 of traversing the parse tree 322 to generate IR nodes of the IR tree 326 is essentially as follows. The parse tree traverser 510 recursively traverses the parse tree 322 to identify subtrees of it representative of scopes of the C* program. A scope of a C* program could be the set of C* statements written between a pair of brackets, the set of C* statements affected by C* keyword "where", the set of C* statements affected by the C* keyword "with", the set of C* statements comprising a function or the set of C* statements comprising a file. The middle end 312 processes each scope as follows. The declaration recorder 522 records the variables declared in the scope. From the parse tree nodes representative of executable statements, the executable IR generator 520 generates a subtree of the IR tree 326 (called an IR subtree). The close scope IR generator 524 then prepends IR nodes for any declarations recorded for the scope to the IR subtree. The declarations in the prepended IR are in the same order as they occurred in the C* program. The close scope IR generator 524 may also prepend and append additional IR nodes to the IR subtree.

FIG. 6A shows the detailed method by which the modules of the middle end 312 carry out the step 412. In a step 610, the parse tree traverser 510 determines whether there are additional nodes in the parse tree 322. If so, then the next such node is referred to as "next_PT" (see step 612) and is processed as follows.

In step 614, the middle end 312 determines whether next_PT is a variable declaration. If so, then in a step 616 the declaration recorder 522 adds the declaration to a list called "declaration_list".

If next_PT is not a declaration, then in a step 618 the middle end 512 determines whether it represents an executable statement. If so, then in a step 620 the executable IR generator 520 adds the appropriate IR node(s) to the IR subtree for the scope currently being processed. The method by which the middle end 312 carries out the step 528 is described in greater detail in the above-cited U.S. Patent Applications entitled Compiler for Processing Parallel Communication Instructions, and System and Method for Shape Selection and Contextualization.

If next_PT does not represent a function declaration or an executable statement, then in a step 622 the middle end 512 determines whether it represents the beginning of a scope. If so, then in a step 624 the parse tree traverser 510 recursively invokes itself with a subtree of the parse tree 32 rooted by next_PT.

If next_PT does not represent a variable declaration, executable statement or beginning of a scope, then it must represent the end of a scope. In that case, in a step 626 the close scope IR generator 524 completes the IR subtree associated with the current scope by prepending and appending appropriate IR nodes. The operation of the close scope IR generator 524 is described in greater detail in FIG. 6B in the accompanying text.

After carrying out the step 616, 620, 624 or 626, flow of control of the middle end 312 returns to the step 610 to process any additional nodes of the parse tree 322. Once all such nodes have been processed, then the middle end 312 has completed carrying out the step 410 of traversing the parse tree 322 to generate the IR tree 326 (see step 628).

FIG. 6B is a flow chart which illustrates the detailed method by which the close scope IR generator 524 carries out the step 652 of FIG. 6A of prepending and appending appropriate IR nodes to an IR subtree. Looking at FIG. 6B, in a step 636 the close scope IR generator 524 determines whether there are additional variable declarations on the declarations_list associated with the scope being processed. If so, then the next such declaration is referred to as next_decl (see step 638) and is processed as follows.

In a step 640, the close scope IR generator 524 determines whether next_decl represents a global shape declaration. Note that the variables on declarations_list would be global if the scope being processed was file scope. If so, then in a step 642 the global shape IR generator 512 prepends to the IR subtree associated with the scope being processed a <global shape declaration> IR node and updates a symbol list. The symbol list has an entry for each global shape, parallel variable and scalar variable which is initialized to point to a parallel variable. The symbol list is used to generate an <end_compilation_unit> IR node, as will be explained below. The method by which the global shape IR generator 512 carries out the step 642 is explained in detail in FIG. 7 and the accompanying text.

If next_decl was not a global shape declaration, then in a step 644 the close scope IR generator 524 determines whether it is a global parallel variable declaration. If so, then in a step 646 the global parallel variable IR generator 514 prepends to the IR subtree and IR node to declare a parallel variable and updates the symbol list. The manner by which the global parallel variable IR generator 514 carries out the step 646 is described in detail in FIG. 8 and the accompanying text.

If next_decl was neither a global shape declaration nor a global parallel variable declaration, then in a step 648 the close scope IR generator 524 determines whether it was a global scalar variable declaration. If so, then in a step 650 the global scalar variable IR generator 516 prepends to the IR subtree an IR node to declare a global scalar variable and updates the symbol list. The manner by which the global scalar variable IR generator 516 carries out the step 650 is explained in detail in FIG. 9 in the accompanying text.

If next_decl was neither a global shape declaration, a global parallel variable declaration nor a global scalar variable declaration, then it must be a local variable declaration. In that case, in a step 652 the middle end 312 prepends an IR node for a local variable declaration.

After carrying out the step 642, 646, 650 or 652, flow of control of the close scope IR generator 524 returns to the step 636 to process any additional declarations on the declaration_list. Once it has processed all such declarations, then in a step 654 the close scope IR generator 524 prepends any additional appropriate IR to the IR subtree. Such IR nodes could include, for example, IR nodes for shape selection and contextualization. The concepts of shape selection and contextualization are explained in greater detail in the above-cited patent application entitled System and Method for Shape Selection and Contextualization.

In a step 656, the close scope IR generator 524 appends any appropriate IR nodes to the IR subtree. Again, such IR nodes could include IR nodes for shape selection and contextualization. Additionally, if the current scope was file scope, then the close scope IR generator 524 generates an <end compilation unit> IR node. The manner by which the close scope IR generator 524 appends the <end compilation unit> IR node is explained in greater detail in the section of this document entitled "End Compilation Unit IR Generation".

After carrying out the step 656, the close scope IR generator 524 has completed carrying out the step 626 of FIG. 6A. (See step 658).

b. Global Shape IR Generation

FIG. 7 is a flow chart which illustrates the detailed method of the global shape IR generator 512 in carrying out the step 642 of FIG. 6B prepending an IR node for a global declaration to an IR subtree and updating the symbol list. In a step 710, the global shape IR generator 512 generates a <declare_global_shape> IR node. The <declare_global_shape> IR node has a definition field, a symbol field and an initializer field.

In a step 712, the global shape IR generator 512 consults the symbol table 324 to determine whether the declaration is a definition. If so, then in a step 714 the global shape IR generator 512 sets a definition field of <declare_global_shape> to 1. In a step 716, the global shape IR generator 512 sets a symbol field of <declare_global_shape> to the symbol of the shape being declared. The symbol of a variable is the entry for it on the symbol table 324. As an example of a defining declaration of a global shape, for the C* source code:

shape A;

the global shape IR generator 512 would generate an IR node which could be represented as follows.

| DECLARE_GLOBAL_SHAPE | SHAPE A |
|---|---|
| DEFINITION 1 | |

In a step 718, the global shape IR generator 512 places the symbol of the parallel variable in a symbol field of a node of a list of defined shapes called "shapes_defined". This list is one of several which form the symbol list. The end compilation unit IR generator 518 will use the symbol list to generate an <end_compilation_unit> IR node, as will be explained below.

In a step 720, the global shape IR generator 512 sets an initializer field of the shapes_defined node to the IR node(s) for any initializer of the shape specified in the C* program. To generate these IR nodes, it uses functions of the front end 310 to generate an assign parse tree for the initializer in the C* program. It then uses functions of the middle end 312 to generate an assign IR tree from the assign parse tree. Finally, it sets the initializer field to the assign IR parse tree. Note that the global parallel variable IR generator 514 and the global scalar variable IR generator 516 set initializer fields for the nodes of symbol list in a similar manner.

In a step 722, the global shape IR generator 512 adds the shapes_defined node to the shapes_defined list.

If current_statement is not a definition, then it is processed by the global shape IR generator 512 as follows. In a step 724, the global shape IR generator 512 sets the definition field of the <declare_global_shape> IR node to 0. In a step 726, the global shape IR generator 512 sets the symbol field of the IR node to the symbol of the symbol table 322 for the shape being declared. As an example, for the non-defining C* declaration:

extern shape E;

the global shape IR generator 512 would generate an IR node which could be represented as follows.

| DECLARE_GLOBAL_SHAPE | SHAPE E |
|---|---|
| DEFINITION 0 | |

In a step 728, the global shape IR generator 512 sets the symbol field of a node of a list called "shapes_referenced". The shapes_referenced list contains global shapes which are declared but not defined in the compilation unit. Like the shapes_defined_list, the shapes_referenced list is a part of the symbol list. In a step 730, the global shape IR generator 512 adds the shapes_referenced node to the shapes_referenced list.

After the step 722 or the step 730, then in a step 732 to the global shape IR generator 512 prepends the <declare_global_shape> IR node to the IR tree 326. After the step 732, the global shape IR generator 512 has completely carried out the step 642 of FIG. 6B (see step 734).

c. Global Parallel Variable IR Generation

FIG. 8 is a flow chart which illustrates the detailed method of the global parallel variable IR generator 514 in carrying out the step 646 of FIG. 6B. In a step 810, the global parallel variable IR generator 514 determines from the symbol table 324 whether the declaration is also a definition. If so, then it processes the declaration as follows.

In a step 812, the global parallel variable IR generator 514 determines whether there are additional parallel variables declared in the declaration. If so, then it processes the next such parallel variable as follows.

In a step 814, it generates a <declare_global_pvar> IR node. In a step 816, it sets a definition field of the IR node to 1, to indicate that the declaration is a definition. In a step 818, it sets a symbol field of the IR node to the symbol for the parallel variable in the symbol table 324. For each node in the pvars_defined list, the global parallel variable declaration IR handler 1014 emits a heap field variable and heap allocation function. For each parallel variable in each node of the pvars_defined list, it emits an initialization flag and a parallel variable allocation function. The heap field variable(s) and allocation function(s) are always static. The parallel variable initialization flag(s) and allocation function(s) are static when the parallel variable they represent is static. As an example, for the C* statements:

int: physical i;

int:physical a = 5;

the global parallel variable IR generator 514 generates IR nodes which could be represented as follows:

| DECLARE_GLOBAL_PVAR | PVAR i |
|---|---|
| DEFINITION 1 | |
| DECLARE_GLOBAL_PVAR | PVAR a |
| DEFINITION 1 | |

In a step 820, the global parallel variable IR generator 514 sets a symbol field of a node of a "variables" list to the symbol for the parallel variable in the symbol table 324. The variables list is a list of symbols of parallel variables to which a single heap field will be allocated. In a step 822, the global parallel variable IR generator 514 sets an initializer field of the variables node to the IR node(s) for any initializer of the parallel variable specified in the C* program. As explained above, the global parallel variable IR generator 514 sets the initializer field by generating an assigned parse tree for the initializer in the C* program, generating an assign IR tree from the assign parse tree and assigning the assign IR tree to the initializer field. In a step 824, the global parallel variable IR generator 514 adds the variables node to the variables list. After the step 824, flow of control of the global parallel variable IR generator 514 returns to the step 812 to process any additional parallel variables in the declaration.

Once it has determined in the step 812 that all of the parallel variables in a defining declaration have been processed, then a pvars_defined node is added to a pvars_defined list as follows. In a step 837, the global parallel variable IR generator 514 assigns the variables list just generated to a variables field of the pvars_defined node. In a step 838, the global parallel variable IR generator 514 sets a shape field of the pvars_node to the shape specified in the parallel variable declaration. In a step 840, it sets a shape calculation field of the pvars_defined node to the IR nodes for any instructions required to calculate the shape. The manner by which the IR nodes are determined is similar to that for the IR nodes of the initializer field, as described above. In a step 842, the global variable IR generator 514 it sets a heap size field of the pvars_defined node to the amount of memory required by the parallel variables in the symbol_init_list. In a step 844, it sets a number field of the pvars_defined node for use in generating the name of the heap field allocation function and the heap field ID for the parallel variables in the symbol_init_list. In a step 846, it adds the pvars_defined node to the pvars_defined list. After the step 846, the global parallel variable IR generator 514 has completed carrying out the step 646 of FIG. 6B (see step 848).

As a first example, for the C* statement:

int:physical i;

the global parallel variable IR generator 514 generates a pvars_defined node which could be represented as follows:

| VARIABLES | i |
|---|---|
| SHAPE | physical |
| SHAPE CALCULATION | |
| HEAP_FIELD_SIZE | 32 |
| NUMBER | 0 |

As a second example, for the C* statement:

int:physical a = 5;

the global parallel variable IR generator 514 generates a pvars_defined node which could be represented as follows:

| VARIABLES | a = ( | BLOCK | BODY <IR_inst> |
|---|---|---|---|
| | DECLARE_LOCAL_PVAR | PVAR | CMC_dealloc_to _0 (PU) |
| | | | INITIALIZER <IR_inst> (null) |
| | | | SHAPE CM_current_vp_set (SU) |
| | | | SHAPE_CALCULATION <IR_inst> |
| (null) | | | |
| | | | STACK_FIELD_SIZE 0 |
| | | CURRENT_SHAPE (null) | |
| | | FIRST <IR_inst pointer> (null) | |
| | | PREVIOUS <IR_inst pointer> (null) | |
| | | NEXT <IR_inst pointer> (null) | |
| | DECLARE_LOCAL_PVAR | PVAR CMC_p_temp_0 (PS) | |
| | | INITIALIZER <IR_inst> (null) | |
| | | SHAPE CM_current_vp_set (SU) | |
| | | SHAPE_CALCULATION <IR_inst> (null) | |
| | | STACK_FIELD_SIZE 32 | |
| | | CURRENT_SHAPE (null) | |

|                                                                                                                                     |                        |                 |
| ----------------------------------------------------------------------------------------------------------------------------------- | ---------------------- | --------------- |
| FIRST (IR_inst pointer> (null)                                                                                                      |                        |                 |
| PREVIOUS <IR_inst pointer> (null)                                                                                                   |                        |                 |
| NEXT <IR_inst pointer> (null)                                                                                                       |                        |                 |

```
                    FIRST (IR_inst pointer> (null)
                    PREVIOUS <IR_inst pointer> (null)
                    NEXT <IR_inst pointer> (null)
        PROMOTE DEST    CMC_p_temp_0
                SOURCE 5
        ASSIGN DEST a
                SOURCE  CMC_p_temp_0
        ADDRESS_OF DEST (null)
                SOURCE a
        DEALLOCATE_STACK_FIELDS    STACK_FIELD_NAME    CMC_dealloc_to_0
)
        SHAPE           physical
        SHAPE CALCULATION
        HEAP_FIELD_SIZE 32
        NUMBER 1
                                   PVARS_REFERENCED
                                   SCALAR_INITIALIZERS p b = ( BLOCK BODY
<IR_inst
>
        DECLARE_LOCAL_SCALAR       VARIABLE CMC_s_temp_0 (PP)
                                            INITIALIZER <IR_inst> (null)
                                            SUPPRESS_INITIALIZER 1
        CAST DEST  CMC_s_temp_0
                SOURCE 0
                DEST_TYPE  CMC_Pvar_t *
        ASSIGN DEST B
                SOURCE     CMC_s_temp_0
)
```

Copyright, Thinking Machines Corporation, 1991.

If in the step 810 the declaration was found not to be a definition, then the declaration is processed as follows. In a step 826, the global shape IR generator 512 determines whether there are additional parallel variables declared in the declaration. If so, then the next such parallel variable is processed as follows.

In a step 828, the global parallel variable IR generator 514 generates a <declared_global_pvar>node. In a step 830, it sets the definition field of the IR node to 0, to indicate that the declaration is not a definition. In a step 832, it sets the symbol field of the IR node to symbol for the parallel variable in the symbol table 324. In a step 834, it adds the symbol for the parallel variable to a list called "pvars_referenced". The pvars_referenced list contains all parallel variables referenced but not defined in the compilation unit. The list is part of the symbol list.

After the step 834, flow of control of the global parallel variable IR generator 514 returns to the step 826 to process any additional parallel variables in the declaration. Once it has processed all such parallel variables, it has completed carrying out the step 646 of prepending IR node(s) for the global parallel variable declaration and updating the symbol list. (See step 836).

d. Global Scalar Variable IR Generation

FIG. 9 is a flow chart of the method by which the global scalar variable IR generator 514 carries out the step 626 of FIG. 6 to generate an IR node for a global scalar declaration. In a step 910, the global scalar variable IR generator 516 generates a <declare_global_scalar> IR node. In a step 912, it determines whether the scalar variable declaration is also a definition. If so, then the declaration is processed as follows.

In a step 914, the global scalar variable IR generator 516 sets a definition field of <declar_global_scalar> to 1 to indicate that the declaration is a definition. In step 916, it sets a symbol field of the IR node to the symbol for the scalar variable in the symbol table 324. In a step 918, the global scalar variable IR generator 516 determines whether the declaration is a scalar pointer to a parallel value. If so, then the declaration is processed as follows.

In a step 920 the global scalar variable IR generator 516 sets a suppress_initializer field of the IR node to indicate to the back end 314 that any initializer of the declaration should be suppressed. The address of a parallel value, and therefore the value of a pointer to a parallel value, is undefined at compile time. Accordingly, instead of emitting the initializer, the back end 314 will emit C/Paris code to initialize the pointer at run-time. The manner by which the back end 314 processes a scalar declaration initialized to the address of a parallel value is described in greater detail in FIG. 12B and the accompanying text.

In a step 922, the global scalar variable IR generator 516 places the symbol of the scalar pointer to parallel in a symbol field of a node of a list of scalar variables called "scalar_initializers." The scalar_initializers list is part of the symbol list that the end compilation unit IR generator 518 will use to generate the <end_compilation_unit> IR node.

In a step 924, the global scalar variable IR generator 516 sets an initializer field of the scalar_initializers node to the IR node(s) for any initializer of the scalar variable specified in the C* program. Such IR node(s) are generated in the same manner as those for an initializer of a shape or parallel variable declaration, as explained above. In a step 926, the global scalar IR generator 516 adds the scalar_initializers node to the scalar_initializers list.

As an example, for the C* statement:

```
int:S*p=&i;
``` the global scalar variable IR generator 516 would generate a scalar_initializers node which could be represented as follows:

```
                             SCALAR_INITIALIZERS b = ( BLOCK BODY
```

-continued
```
<IR_inst>
    DECLARE_LOCAL_SCALAR    VARIABLE CMC_s_temp_0
                            INITIALIZER <IR_inst> (null)
                            SUPPRESS_INITIALIZER 1
        CAST DEST           CMC_s_temp_0
            SOURCE 0
            DEST_TYPE CMC_Pvar_1 *
        ASSIGN DEST B
            SOURCE CMC_s_temp_0
)
```

If, on the other hand, the defining declaration is not a definition of a pointer to a parallel variable or structure, then in a step 928 the global scalar variable IR generator 516 indicates that any initializer of the declaration should not be suppressed by setting the suppress_initializer field of the IR node to 0. Alternatively, suppress_initializer could be set to 0 only for declarations which had initializers.

An example of such a definition is the C* statement:

```
int x=0;
```

The IR node for this definition could be represented as follows:

```
DECLARE_GLOBAL_SCALAR VARIABLE x
        SUPPRESS_INITIALIZER 0
        DEFINITION 1
```

If in step 912 the declaration was found not to be a definition, then the global scalar IR generator 516 processes it as follows.

In a step 930, the global scalar variable IR generator 514 sets the definition field of the IR node to 0. Then, in a step 932, it sets the symbol field of the IR node to the symbol for the scalar variable in the symbol table 324. Note that the suppress_initializer field of the IR node could be set to 1, since a non-defining declaration cannot have an initializer. As an example, for the C* statement:

```
extern int:i;
```

The global scalar variable IR generator 516 would generate the following C/Paris code:

```
DECLARE_GLOBAL_SCALAR VARIABLE i
```

-continued
```
        SUPPRESS_INITIALIZER 1
        DEFINITION 0
```

After the step 926, 932 or 934, the global scalar variable IR generator 516 has completely carried out the step 650 of FIG. 6B of generating an IR node for a global scalar declaration and updating the symbol list (see step 934).

e. End Compilation Unit IR Generation

Once the middle end 312 has processed all of the parse tree nodes of a compilation unit, it generates an <end_compilation_unit> IR node. The <end_compilation_unit> IR node has five fields which the middle end 312 sets while processing the parse tree nodes. The fields are: (1) the shapes_defined list of shapes defined in the compilation unit, (2) the shapes_referenced lists of shapes referenced in the compilation unit, (3) the pvars_defined list of sets of parallel variables which will be allocated from a single heap field, (4) the pvars_referenced list of parallel variables referenced in the compilation unit, and (5) the scalar_initializers list of scalar pointers to parallel variables.

As an example, for the C* code:

```
shape A;
shape []B;
shape [2]C;
extern shape E;
int: physical i;
int: physical *p;
int: physical a = 5;
int: physical *b = 0;
int: physical *c = &i;
``` the end compilation unit handler 518 would generate an <end_compilation_unit> IR node which could be represented as follows:

```
END_COMPILATION_UNIT SHAPES_DEFINED   A   B   C
                     SHAPES_REFERENCED E
                     PVARS_DEFINED  <Alloc_list>
            VARIABLES           i
            SHAPE               physical
            SHAPE CALCULATION
            HEAP_FIELD_SIZE     32
            NUMBER              0
            VARIABLES           a = (
                DECLARE_LOCAL_PVAR         BLOCK    BODY <IR_inst>
                                           PVAR CMC_dealloc_to_0 (PU)
                                                    INITIALIZER <IR_inst> (null)
                                                    SHAPE CM_current_vp_set (SU)
                                                    SHAPE_CALCULATION <IR_inst> (null)
                                                    STACK_FIELD_SIZE 0
                                           CURRENT_SHAPE (null)
                                           FIRST <IR_inst pointer> (null)
                                           PREVIOUS <IR_inst pointer> (null)
                                           NEXT <IR_inst pointer> (null)
                DECLARE_LOCAL_PVAR            PVAR CMC_p_temp_0 (PS)
                                           INITIALIZER <IR_inst> (null)
                                           SHAPE CM_current_vp_set (SU)
```

```
                            SHAPE_CALCULATION  <IR_inst>  (null)
                            STACK_FIELD_SIZE 32
                            CURRENT_SHAPE (null)
                            FIRST (IR_inst pointer>  (null)
                            PREVIOUS <IR_inst pointer>  (null)
                            NEXT <IR_inst pointer>  (null)
        PROMOTE DEST CMC_p_temp_0
                SOURCE 5
        ASSIGN DEST a
                SOURCE CMC_p_temp_0
        ADDRESS_OF DEST (null)
                SOURCE a
        DEALLOCATE_STACK_FIELDS      STACK_FIELD_NAME      CMC_dealloc_to_0
)
    SHAPE              physical
    SHAPE CALCULATION
    HEAP_FIELD_SIZE 32
    NUMBER 1
                                    PVARS_REFERENCED
                                    SCALAR_INITIALIZERS p   b = ( BLOCK BODY <IR_inst
>
        DECLARE_LOCAL_SCALAR        VARIABLE CMC_s_temp_0 (PP)
                                            INITIALZER <IR_inst> (null)
                                            SUPPRESS_INITIALIZER 1
        CAST DEST CMC_s_temp_0
                SOURCE 0
                DEST_TYPE    CMC_Pvar_t *
        ASSIGN DEST B
                SOURCE    CMC_s_temp_0
)
        c = ( BLOCK BODY <IR_inst>
        DECLARE_LOCAL_SCALAR        VARIABLE CMC_s_temp_1 (PP)
                                            INITIALIZER <IR_inst> (null)
                                            SUPPRESS_INITIALIZER 1
        ADDRESS_OF       DEST CMC_s_temp_1
                         SOURCE i
        ASSIGN DEST c
                SOURCE    CMC_s_temp_1
)
```
Copyright, Thinking Machines Corporation, 1991.

6. C/Paris Code Generation a. Overview

FIG. 10 is a block diagram which shows modules of the back end 314 which generate C/Paris code for declarations of global run-time variables. Note that the back end 314 has additional modules which are not part of the present invention and are not shown. The modules of FIG. 10 are a start compilation unit IR handler 1010, a global shape declaration IR handler 1012, a global parallel variable declaration IR handler 1014, a global scalar variable declaration IR handler 1016, and an end compilation unit IR handler 1018.

FIGS. 11A and 11B show a flow chart which illustrates the method by which the back end 314 carries out the step 416 of FIG. 4 of generating C/Paris code from the nodes of the IR tree 326. Looking at FIG. 11A, in a step 1110 the back end 314 determines whether there are nodes of the IR tree 326 which it has not yet processed. If so, then the next such node is referred to as "current_IR_node" (see step 1112) and is processed as follows. In a step 1114, the back end 314 determines whether current_IR_node is a <start_compilation_unit> IR node.

If so, then in a step 616 the start compilation unit IR handler 1010 emits "#include" statements to include typedefs which are used in C/Paris code emitted. In a step 1118, the start compilation unit IR handler 1010 emits a statement to indicate the version of the C* compiler 154. Specifically, in the steps 1116 and 1118, the start compilation unit IR handler 1010 would emit the following C/Paris code:

```
#include <_CMC_type.h>
#include <_CMC_defs.h>
static char CMC_version() = "C* Version 6.0.2 (60) for sun4";
```

If current_IR_node is not a <start_compilation_unit> IR node, then in a step 1120 the back end 214 determines whether it represents a global variable declaration. If so, then in a step 1122 the back end 314 emits C/Paris code to declare the variable. The manner in which the back end 314 carries out the step 1122 is described in greater detail in FIG. 12 and the accompanying text.

Otherwise, in a step 1128 the back end 314 determines whether current_IR_node is an <end_compilation_unit> IR node. If so, then the end compilation unit IR handler 1018 processes current_IR_node as follows. In a step 1134 the end compilation unit IR handler 1018 emits C/Paris code for initialization flags and allocation functions for each shape defined. It determines such shapes from the shapes_defined field of <end_compilation_unit>. The manner by which the end compilation unit IR handler 1134 carries out the step 1018 is explained in greater detail in FIG. 13 and the accompanying text.

Then, in a step 1136, the end compilation unit IR handler 218 emits C/Paris code to define an initialization flag and an allocation function for each parallel variable defined. It determines such parallel variables from the pvars_defined field of <end_compilation_unit>. The manner by which it carries out the step 1136 is explained in greater detail in FIG. 14 and the accompanying text.

Next, in a step 1138 the end compilation unit IR handler 1018 emits C/Paris code to define a pointer to an initialization function and, possibly, to define an initialization function for each scalar variable which was initialized to the address of a parallel variable. It determines such scalar variables from the scalar_initializers field of <end_compilation_unit>. The manner by which the end compilation unit IR handler 1018 carries out the step 1138 is explained in greater detail in FIG. 15 and the accompanying text.

Finally, in a step 1140 the end compilation unit IR handler 1018 emits C/Paris code for a start trap for the compilation unit being processed. At run time, the start trap is called upon entry to the compilation unit. The start trap contains C/Paris code to initialize the data parallel computer 110 (if it has not already been initialized) and to call any allocation functions and initialization functions generated in the steps 1134, 1136 and 1138. The manner by which the end compilation unit IR handler 1134 carries out the step 1140 is explained in greater detail in FIG. 16 and the accompanying text.

If in the step 1132 the back end 314 determines that current_IR_node was not an <end_compilation_unit> IR node, then in a step 1142 it emits the appropriate C/Paris code for current_IR_node. The manner in which the back end 314 carries out the step 1136 is similar to that for a conventional compiler.

After carrying out the step 1118, 1122, 1140 or 1142, the back end 314 has completely processed current_IR_node. Accordingly, the flow of control of the back end 314 then returns to the step 1110 (see path 1138). When the back end 314 determines in the step 1110 that it has processed all of the IR nodes, then the back end 314 has completely carried out the step 416 of FIG. 4 of generating C/Paris code from nodes of the IR tree 326.

b. Global Variable Target Code Generation

FIGS. 12A and 12B show a flow chart of the manner in which the back end 314 carries out the step 1122 of emitting a C/Paris global variable declaration. Looking at FIG. 12A, in a step 1220 the back end 314 determines whether current_IR_node is a <declare_global_shape> IR node. If so, then the global shape declaration IR handler 1012 processes current_IR_node as follows.

In a step 1222, it emits C/Paris code to declare the global shape. In a preferred embodiment, it does so by sending attributes of the shape (indicated by the symbol field of current_IR_node) to the pretty printer 320 of FIG. 3. The pretty printer 320 returns a string of C/Paris code for the declaration. The global shape declaration IR handler 1012 then emits this string.

Then in a step 1224, the global shape declaration IR handler 1012 determines from the definition field of current_IR_node whether the shape declaration is also a definition. If it is, then in a step 1226 the global shape declaration IR handler 1012 emits C/Paris code to initialize the shape to "CMC_no_vp_set" as explained above in the section of this document entitled "Overview of Global Run-Time Variable Processing". For example, for the C* statement:

shape A;

the global shape declaration IR handler 1012 emits the following C/Paris code:

CMC_Shape_t A = CMC_no_vp_set;

If current_IR_node is not a global shape declaration, then in a step 1228 the back end 314 determines whether current_IR_node is a global parallel variable declaration. If so, then the global parallel variable declaration IR handler 1014 processes current_IR_node as follows. In a step 1130, it emits C/Paris code to declare the parallel variable. The means by which it carries out the step 730 is similar to the means by which the global shape declaration IR handler 1012 carries out the step 1222 (described above). Next, in a step 1232 the global parallel variable declaration IR handler 1014 determines from the definition field of current_IR_node whether the parallel variable declaration is also a definition. If it is, then in a step 1234 the global parallel variable declaration IR handler 1014 emits C/Paris code to initialize the parallel variable to an initial value called "CMC_no_field", as explained above in the section entitled "Overview of Global Run-Time Variable Processing". For example, for the C* statement:

int: S i;

it would emit the C/Paris statement:

CMC_Pvar_t i = CMC_no_field;

If the global variable declaration represented by current_IR_node is not of a shape or a parallel variable, then it must be of a scalar variable. If that is the case, then the global scalar variable declaration IR handler 1016 processes current_IR_node as follows. In a step 1238 of FIG. 12B, the global scalar variable declaration IR handler 1016 determines from the suppress_initializer field of current_IR_node whether the scalar declaration includes an initialization which should be suppressed.

The pretty printer 320 returns a string of C/Paris code for the declaration (and not the initializer). In a step 1240, the global scalar variable declaration IR handler 1016 emits the C/Paris string. As an example, for the C* statement:

int:physical *C = &i;

it would emit the following C/Paris code:

CMC_Pvar_t c;

If the scalar variable declaration did not have an initializer which was to be suppressed, then the global scalar variable declaration IR handler 1016 invokes the pretty printer 320 with the attributes of the declaration indicated by the symbol field and an argument to indicate that the initializer (if any) is not to be suppressed. In a step 1242, the global scalar variable declaration IR handler 1016 emits C/Paris code returned by the pretty printer 320 to declare (and possibly initialize) the scalar variable. For example, for the C* statement:

int: physical *b it would emit the following C/Paris code:

CMC_Pvar_t b;

As a second example, for the C* statement:

```
int y=5;
``` the global scalar variable declaration IR handler 1016 would emit the following C/Paris code:

```
int y=5;
```

Note that the C/Paris code for a declaration of a global scalar variable which is not a parallel variable is identical to the C* code for the same declaration.

After carrying out the step 1224, 1226, 1232, 1234, 1240 or 1244, the back end 314 has completed the step 1222 of FIG. 12 of emitting a C/Paris global variable declaration (see step 1246).

c. Global Shape Allocation

FIG. 13 is a flow chart which illustrates the method by which the global shape declaration IR handler 1012 carries out the step 1134 of FIG. 11 of emitting initialization flags and allocation functions for each shape in shapes_defined. The method is essentially as follows. For each shape in the shapes_defined list, the global shape declaration IR handler 1012 emits an initialization flag and a shape allocation function. If the storage class of the shape is static, both the initialization flag and the allocation function must have storage class status.

Looking at FIG. 13, in a step 1310 the global shape declaration IR handler 1012 determines whether there are additional shapes in the shapes_defined field of the <end_compilation_unit> IR node. If so, then the next such shape is referred to as "next_shape" (see step 1312) and is processed as follows.

In a step 1314, the global shape declaration IR handler 1012 emits a defining declaration of the next_shape initialization flag and initializes it to 1. For example, for the C* statement:

```
shape A;
``` it would emit the following C/Paris statement:

```
int CMC_A_init_flag=1;
```

In a step 1316, the global shape declaration IR handler 1012 determines whether the declaration had an initializer. It does so by examining the initializer field of next_shape. If it did not, then in a step 1320 the global shape declaration IR handler 1012 determines whether next_shape is fully specified. If so, then in a step 1322 the global shape declaration IR handler 1012 emits C/Paris code for a function to allocate next_shape and to set the initialization flag for next_shape to 1. For example, for the C* statement:

```
shape [2]C;
``` it emits the following C/Paris function:

```
void CMC_alloc_C()
{
int shape_axes[1];
shape_axes[0] = 2;
C = CMC_allocate_shape(1, shape_axes);
CMC_C_init_flag = 0;
}
void (*CMC_alloc_C_pointer)() = CMC_alloc_C;
```

If next_shape was neither initialized nor fully specified, then in a step 1324 the global shape declaration IR handler 1012 determines whether next_shape is partially specified. If so, then in a step 1326 the global shape declaration IR handler 1012 emits C/Paris code for a function to initialize next_shape to -(rank of shape) and to set the initialization flag for next_shape to 0. As an example, for the C* statement:

```
shape []B;
``` it would emit the following C/Paris function:

```
void CMC_alloc_B()
{
B = -1;
CMC_B_init_flag = 0;
}
void (*CMC_alloc_B_pointer)() = CMC_alloc_B;
```

If next_shape was neither initialized, fully specified nor partially specified, then it must be unspecified. In that case, in a step 1328 a global shape declaration IR handler 1012 emits C/Paris code for a function to initialize next_shape to -32 and to set the initialization flag to true. As an example, for the C* statement:

```
shape A;
``` it would emit the following C/Paris function:

```
void CMC_alloc_A()
{
A = -32;
CMC_A_init_flag = 0
}
void (*CMC_alloc_A_pointer)() = CMC_alloc_A;
```

Note that if in any of the above three cases the shape is an array, then the global shape declaration IR handler 1012 emits a similar function, but with one assignment to each array element. As an example, for the C* statement:

```
shape [2]S[2];
``` it would emit the following C/Paris functions:

```
{
int shape_axes[1];
shape_axes[0] = 2;
*(S + 0) = CMC_allocate_shape(1, shape_axes);
*(S + 1) = CMC_allocate_shape(1, shape_axes);
CMC_S_init_flag = 0;
}
```

If in the step 1316 next_shape was found to have an initializer, then in step 1318 the global shape declaration IR handler 1012 emits C/Paris code for a function to initialize next_shape and to set the initialization flag for next_shape to 0. All of the variations for fully specified, partially specified, unspecified and array shapes have been appropriately accounted for by the global shape IR generator 512 in generating the IR nodes for the initializer. Therefore, the global shape declaration IR handler 1012 determines the C/Paris code for the body of the allocation function from the initializer field of the <declare_global_shape≦IR node. As an example, for the C* statement:

shape S=allocate_shape(&S,2,4,8);

the global shape declaration IR handler 1012 emits the following C/Paris code:

```
void CMC_alloc_s()
{
CMC_Shape_t CMC_sh_temp_0 = -32;
CMC_Shape_t (*CMC_s_temp_0);
CMC_s_temp_0 = &S;
CMC_sh_temp_0 = allocate_shape(CMC_s_temp_0,2,4,8);
S = CMC_sh_temp_0;
CMC_S_init_flag = 0;
```

After carrying out the step 1318, 1322, 1326 or 1328, the global shape declaration IR handler 1012 has fully carried out the step 1134 of emitting initialization flags and allocation functions for each shape defined.

d. Global Parallel Variable Allocation

FIG. 14 is a flow chart which illustrates the manner in which the global parallel variable declaration IR handler 1014 carries out the step 1234 of FIG. 12 of emitting initialization flags and allocation functions for each parallel variable in pvars_defined. Looking at FIG. 14, in a step 1410 the global parallel variable declaration IR handler 1014 determines whether there are more pvars_defined nodes in the pvars_defined list which it has not yet processed. As stated above, each pvars_defined node represents a set of parallel variables which share a heap field. If so, then the next such node is referred to as next_pvar_set (see a step 1412) and is processed as follows.

In a step 1414 the global parallel variable declaration IR handler 1014 emits C/Paris code to declare a heap field variable. In a step 1416, the global parallel variable declaration IR handler 1014 emits C/Paris code to allocate a heap field and assign it to the heap field variable just declared. It determines the name of the heap field variable and the size and shape of the heap field from the fields of next_pvar_set. For example, for a set containing a single parallel variable of type integer and of shape "physical", the global parallel variable declaration IR handler 1014 emits the following C/Paris code:

```
static CMC_Pvar_t CMC_hf_0 = CMC_no_field;
static void CMC_alloc_hf_0()
{
CMC_hf_0 = CM_allocate_heap_field_vp_set(32, physical);
}
int CMC_i_init_flag = 1;
```

In a step 1418, the global parallel variable declaration IR handler 1014 determines whether there are additional variables nodes on the variables list for next_pvar_set. If so, then the next such parallel variable is referred to as "next_pvar" (see a step 1420) and is processed as follows.

In a step 1422 the global parallel variable declaration IR handler 1014 emits C/Paris code to declare an initialization flag for next_pvar and initialize the flag to 1. Then, in a step 1424, the global parallel variable declaration IR handler 1014 emits a function to allocate the parallel variable represented by next_pvar. The allocation function sets the parallel variable to the location of the heap field pointed to by the heap field variable. It then offsets the heap field variable by the size of next_pvar. Performing the offset assures that each parallel variable in the variables list is associated with a portion of the heap field which does not overlap the portion of any other parallel variable. Finally, the allocation function sets the initialization flag for next_pvar to 0. As an example, for the C* statement:

```
int: physical i=0;
``` the global parallel variable declaration IR handler 1014 emits the following C/Paris code:

```
int CMC_i_init_flag = 1;
void CMC_alloc_i()
{
CMC_Pvar_t cg_entry_context;
if(CMC_hf_0 == CMC_no_field) CMC_alloc_hf_0();
i = CMC_hf_0;
CMC_hf_0 = CM_add_offset_to_field_id(CMC_hf_0, 32);
CM_set_vp_set(CM_field_vp_set(i));
cg_entry_context = CM_allocate_stack_field(1);
CM_store_context(cg_entry_context);
CM_set_context();
CM_s_move_zero_always_1L(CM_add_offset_to_field_id(i, 0), 32);
CMC_i_init_flag = 0;
CM_load_context(cg_entry_context);
CM_deallocate_stack_through(cg_entry_context);
}
```

After carrying out the step 1424, flow of control of the global parallel variable declaration IR handler 1014 returns to the step 1418 to process any additional parallel variables in next_pvar_set (see a path 1426). Once all such parallel variables have been processed, then flow of control of the global parallel variable declaration IR handler 1014 returns to the step 1410 to process any additional sets in pvars_defined. Once it has processed all such sets, then the global parallel variable declaration IR handler 1014 has completed carrying out the step 1136 of emitting initialization flags and allocation functions for each parallel function in pvars_defined.

e. Global Scalar Variable Initialization

FIG. 15 is a flow chart which shows the manner by which the scalar variable declaration IR handler 1016 carries out the step 1240 of emitting initialization functions and/or pointers to initialization functions for global scalar variables. Looking at FIG. 15, in a step 1510 the global scalar variable declaration IR handler 1016 determines whether there are additional scalar_initializer nodes in the scalar_initializers list which it has not yet processed. If so, then the next such node is referred to as next_scalar (see a step 1512) and is processed as follows.

In a step 1514, the global scalar variable declaration IR handler 1016 examines the initializer field of next_scalar to determine whether the declaration includes an initialization. If so, then the declaration is processed as follows. In a step 1516, the global scalar variable declaration IR handler 1016 emits a function to conditionally call the start trap for the compilation unit and initialize the scalar variable. The start trap call is conditioned upon the start trap flag being zero. This would indicate that the function is being called from outside the compilation unit and that the start trap has therefore not yet been called. It is essential that the start trap be called before the initialization is executed. The global scalar variable declaration IR handler 1016 generates the code to initialize the scalar variable from the IR node(s) in the initializer field of next_scalar.

Then, in a step 1518 the global scalar variable declaration IR handler 1016 emits a definition of a pointer to the initialization function. As an example, for the C* statement:

```
int: physical *c=&i;
``` it would generate the following C/Paris code:

```
void CMC_alloc_c()
{
    if(CMC_call_start_trap) {
        CMC_start_trap ();
        return;
    }
    {
        CMC_Pvar_t CMC_s_temp_1;
        CMC_s_temp_1 = i;
        c = CMC_s_temp_1;
    }
}
void (*CMC_alloc_c_pointer) () = CMC_alloc_c;
```

Note that in the above C/Paris code, "CMC_s_temp_1" is a compiler-generated temporary variable representative of the parallel variable "i".

If, on the other hand, the declaration of next_scalar does not include an initialization, then in the step 1520 the global scalar variable declaration IR handler 1016 emits a declaration of a pointer to an initialization function for next_scalar. If next_scalar is defined in another compilation unit, its initialization function will be generated in that compilation unit.

After carrying out the step 1518 or 1520, flow of control of the global scalar variable declaration IR handler 1016 returns to the step 1510 to process any additional scalar variables. Once all scalar variables have been processed, then the global scalar variable declaration IR handler 1016 has completely carried out the step 1138 of emitting initialization functions and/or pointers to initialization functions for global scalar variables (see a step 1522).

f. Start Trap Target Code Generation

FIG. 16 is a flow chart which illustrates the manner by which the end compilation unit IR handler 1018 carries out the step 1140 of FIG. 11 of emitting the start trap. In a step 1610, for each shape in shapes_defined, the end compilation unit IR handler 1018 emits C/Paris code to test its initialization flag and call the shape allocation function conditioned on that test. As an example, for the C* statements:

shape A;

shape []B;

shape [2]C;

the end compilation unit IR handler 1018 would emit the following C/Paris code:

if(CMC_A_init_flag) CMC_alloc_A();

if(CMC_B_init_flag) CMC_alloc_B();

if(CMC_C_init_flag) CMC_alloc_C();

In a step 1612, for each shape in shapes_referenced, the end compilation unit IR handler 1018 emits C/Paris code to test the initialization flag and call the shape allocation function conditioned on that test. Note that the allocation functions for such shapes may be in separate compilation units. As an example, for the C* statement:

extern shape E;

the end compilation unit IR handler 1018 would emit the following C/Paris code:

if(CMC__E_init_flag &&
    CMC__alloc_E_pointer)
   (*CMC_alloc_E_pointer)();

In a step 1614, for each parallel variable in pvars_defined, the end compilation unit IR handler 1018 emits a test of its initialization flag and a call to the parallel variable allocation function conditioned on that test. As an example, for the C* statements:

int: physical i;

int: physical j,k,l;

the end compilation unit IR handler 1018 generates the following C/Paris code:

if(CMC_i_init_flag) CMC_alloc_i();

if(CMC_j_init_flag) CMC_alloc_j();

if(CMC_k_init_flag) CMC_alloc_k();

if(CMC_l_init_flag) CMC_alloc_l();

In a step 1616, for each parallel variable in pvars_referenced, the end compilation unit IR handler 1018 emits a test of its initialization flag and a call to its parallel variable allocation function conditioned on that test. Note that the allocation functions for such parallel variables may be in separate compilation units.

In a step 1618, for each scalar variable in scalar_initializers, the end compilation unit IR handler 1018 emits a call to its scalar initializer function conditioned on the pointer to the scalar initializer function. Note that according to Standard C, pointers to functions are initially zero. Therefore, the scalar initialization function is called exactly once. As an example, for the C* statement: As an example, for the C* statements:

int:physical *b=0;

int:physical *c=&i;

the end compilation unit IR handler 1018 will generate the following C/Paris code:

if(CMC_alloc_b_pointer)
   (*CMC_alloc_b_pointer)();

if(CMC_alloc_c_pointer)
   (*CMC_alloc_c_pointer)();

Finally, the end compilation unit IR handler 1018 emits a C/Paris statement to set the start trap flag, so that the start trap will not be called again. After the step 1620, the end compilation unit IR handler 1018 has fully carried out the step 1140 of emitting the start trap (see step 1622). As an example, it could emit the following C/Paris code:

CMC_call_start_trap=0;

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for generating a target code of target statements from a source code of source statements, the source code written using a high level language supporting data parallel processing, the target code to be executed by a data parallel computer comprising a plurality of processing nodes for processing data in parallel, said method being executable in a data processing apparatus and comprising the steps of:
   (a) detecting a source statement which declares a global variable involving parallelism, said global variable involving parallelism comprising a plurality of data instances each processed by one of the processing nodes when the target code is executed by the data parallel computer;
   (b) emitting, in response to detection of said source statement declaring said global variable involving parallelism, a target statement to declare a global scalar variable;
   (c) emitting, in response to detection of said source statement declaring said global variable involving parallelism, a start trap having target statements which, when executed by the data parallel computer, cause the data parallel computer to:
      (i) allocate memory and a data structure in each of said processing nodes for said data instances of said global variable involving parallelism; and
      (ii) initialize in said processing nodes said data structure and said data instances of said global variable involving parallelism; and
   (d) emitting, in response to detection of said source statement declaring said global variable involving parallelism, a target statement which when executed by said data parallel computer causes said data parallel computer to invoke said start trap before the execution of any statement in which said global variable involving parallelism is read from or written to during executing of said target code in said data parallel computer.

2. A method of generating a target code from a source code, the source code written using a high level language supporting data parallel processing, the target code to be executed by a data parallel computer comprising a plurality of processing nodes for processing data in parallel, the method being executable in a data processing apparatus and comprising the steps of:
   (a) detecting in the source code a statement declaring a parallel variable, said parallel variable comprising a plurality of data instances each processed by one of the processing nodes when the target code is executed by the data parallel computer;
   (b) emitting to the target code, in response to said detection and if the source code declaration statement also defines the parallel variable, at least one statement which, when executed by the data parallel computer, enables the data parallel computer to initialize the data instances of the parallel variable;
   (c) emitting to the target code, in response to said detection, an allocation function which when executed by the data parallel computer enables the data parallel computer to allocate memory in the processing nodes for the data instances of the parallel variable;
   (d) emitting to the target code, in response to said detection, at least one statement which when executed by the data parallel computer enables the data parallel computer to establish an initialization flag to indicate whether the allocation function has been executed in the data parallel computer;
   (e) emitting to the target code, in response to said detection, at least one statement which when executed by the data parallel computer enables the data parallel computer to set the initialization flag to a predetermined value such that the initialization flag indicates that the allocation function has not been executed in the data parallel computer;
   (f) emitting to the target code, in response to said detection, a start trap function which when executed by the data parallel computer enables the data parallel computer to determine by reference to the initialization flag whether the allocation function has been executed in the data parallel computer, and to invoke the allocation function when the allocation function has not been executed in the data parallel computer; and
   (g) emitting to the target code, in response to said detection, at least one statement which when executed by the data parallel computer enables the data parallel computer to invoke the start trap function before the parallel variable is used during execution of the target code in the data parallel computer.

3. The method of claim 2, further comprising the steps of:
   (h) detecting in the source code a statement declaring a scalar variable as a pointer to the parallel variable;
   (i) emitting to the target code, in response to detection of the scalar variable declaration statement, an initialization function which when executed by the data parallel computer enables the data parallel computer to declare the scalar variable and to allocate memory in the data parallel computer for the scalar variable;
   (j) emitting to the target code, in response to detection of the scalar variable declaration statement, at least one statement which when executed by the data parallel computer enables the data parallel computer to establish in the target code a second initialization flag to indicate whether the initialization function has been executed in the data parallel computer;
   (k) emitting to the target code, in response to detection of the scalar variable declaration statement, at least one statement which when executed by the data parallel computer enables the data parallel computer to set the second initialization flag to the predetermined value such that the second initialization flag indicates that the initialization function has not been executed in the data parallel computer; and
   (l) emitting to the target code, in response to detection of the scalar variable declaration statement, at least one statement which when executed by the data parallel computer enables the data parallel computer to set the scalar variable equal to an address of the parallel variable after the allocation function associated with the parallel variable has executed in the data parallel computer.

4. The method of claim 3, wherein execution of the start trap function in the data parallel computer further enables the data parallel computer to determine by reference to the second initialization flag whether the initialization function has been executed in the data parallel computer, to invoke the initialization function when the initialization function has not been executed in the data parallel computer, and to set the second initialization flag to a second predetermined value such that the second initialization flag indicates that the initialization function has been executed in the data parallel computer to thereby prevent the initialization function from being executed more than once in the data parallel computer, and wherein step (g) also comprises the step of emitting to the target code at least one statement which when executed in the data parallel computer enables the data parallel computer to invoke the start trap function before the scalar variable is used during execution of the target code in the data parallel computer.

5. The method of claim 2, wherein step (c) comprises the step of emitting to the target code at least one statement which when executed in the data parallel computer enables the data parallel computer to allocate and assign an unused field from a memory heap in each of the processing nodes for the data instances of the parallel variable.

6. The method of claim 2, wherein step (c) comprises the steps of:
(1) emitting to the target code at least one statement which when executed in the data parallel computer enables the data parallel computer to allocate an unused field from a memory heap in each of the processing nodes for a parallel variable group, wherein the parallel variable group includes the parallel variable;
(2) emitting to the target code at least one statement which when executed in the data parallel computer enables the data parallel computer to assign a portion of the allocated field in each of the processing nodes to the data instances of the parallel variable; and
(3) emitting to the target code at least one statement which when executed in the data parallel computer enables the data parallel computer to assign other portions of the allocated field in each of the processing nodes to data instances of other parallel variables in the parallel variable group.

7. The method of claim 6, wherein the parallel variable group comprises parallel variables declared in the source code declaration statement.

8. The method of claim 6, wherein the parallel variable group comprises parallel variables having identical scope and lexically identical shape.

9. The method of claim 6, wherein the parallel variable group comprises parallel variables having identical scope and equivalent shape.

10. The method of claim 2, wherein execution of the start trap function in the data parallel computer further enables the data parallel computer to set the initialization flag to a second predetermined value after the allocation function has been executed in the data parallel computer, thereby preventing the allocation function from being executed more than once in the data parallel computer.

11. A method of generating a target code from a source code, the source code written using a high level language supporting data parallel processing, the target code to be executed in a data parallel computer having a plurality of processing nodes for processing data in parallel, the method being executable in a data processing apparatus and comprising the steps of:
(a) detecting in the source code a statement declaring a shape having P positions organized among R dimensions, the shape being a template for use in declaring parallel variables each having P data instances distributed among P processing nodes logically organized among R dimensions;
(b) emitting to the target code, in response to said detection, an allocation function which when executed in the data parallel computer enables the data parallel computer to allocate the shape to a processor set, the processor set comprising P of the processing nodes;
(c) emitting to the target code, in response to said detection, at least one statement which when executed in the data parallel computer enables the data parallel computer to establish an initialization flag to indicate whether the allocation function has been executed in the data parallel computer;
(d) emitting to the target code, in response to said detection, at least one statement which when executed in the data parallel computer enables the data parallel computer to set the initialization flag to a predetermined value such that the initialization flag indicates that the allocation function has not been executed in the data parallel computer;
(e) emitting to the target code, in response to said detection, a start trap function which when executed in the data parallel computer enables the data parallel computer to determine by reference to the initialization flag whether the allocation function has been executed in the data parallel computer, and to invoke the allocation function when the allocation function has not been executed in the data parallel computer; and
(f) emitting to the target code, in response to said detection, at least one statement which when executed in the data parallel computer enables the data parallel computer to invoke the start trap function before the shape is referenced during execution of the target code in the data parallel computer.

12. The method of claim 11, further comprising the step of emitting to the target code, in response to said detection, at least one statement which when executed in the data parallel computer enables the data parallel computer to determine whether the shape is fully specified, partially specified, or unspecified.

13. The method of claim 11, wherein execution of the start trap function in the data parallel computer also enables the data parallel computer to set the initialization flag to a second predetermined value after the allocation function has been executed in the data parallel computer, to thereby prevent the allocation function from being executed more than once in the data parallel computer.

14. A computer based system for generating a target code from a source code, the source code written using a high level language supporting data parallel processing, the target code to be executed in a data parallel computer having a plurality of processing nodes for processing data in parallel, the system comprising:

(a) first means for detecting in the source code a statement declaring a parallel variable, said parallel variable comprising a plurality of data instances each processed by one of the processing nodes when the target code is executed by the data parallel computer;

(b) second means for emitting to the target code, in response to said detection and if the source code declaration statement also defines the parallel variable, at least one statement which when executed by the data parallel computer enables the data parallel computer to initialize the data instances of the parallel variable;

(c) third means for emitting to the target code, in response to said detection, an allocation function which when executed by the data parallel computer enables the data parallel computer to allocate memory in the processing nodes for the data instances of the parallel variable;

(d) fourth means for emitting to the target code, in response to said detection, at least one statement which when executed by the data parallel computer enables the data parallel computer to establish an initialization flag to indicate whether the allocation function has been executed in the data parallel computer;

(e) fifth means for emitting to the target code, in response to said detection, at least one statement which when executed by the data parallel computer enables the data parallel computer to set the initialization flag to a predetermined value such that the initialization flag indicates that the allocation function has not been executed in the data parallel computer;

(f) sixth means for emitting to the target code, in response to said detection, a start trap function which when executed by the data parallel computer enables the data parallel computer to determine by reference to the initialization flag whether the allocation function has been executed in the data parallel computer, and to invoke the allocation function when the allocation function has not been executed in the data parallel computer; and (g) seventh means for emitting to the target code, in response to said detection, at least one statement which when executed by the data parallel computer enables the data parallel computer to invoke the start trap function before the parallel variable is used during execution of the target code in the data parallel computer.

15. The system of claim 14, further comprising:

(h) eighth means for detecting in the source code a statement declaring a scalar variable as a pointer to the parallel variable;

(i) ninth means for emitting to the target code, in response to detection of the scalar variable declaration statement, an initialization function which when executed by the data parallel computer enables the data parallel computer to declare the scalar variable and to allocate memory in the data parallel computer for the scalar variable;

(j) tenth means for emitting to the target code, in response to detection of the scalar variable declaration statement, at least one statement which when executed by the data parallel computer enables the data parallel computer to establish in the target code a second initialization flag to indicate whether the initialization function has been executed in the data parallel computer;

(k) eleventh means for emitting to the target code, in response to detection of the scalar variable declaration statement, at least one statement which when executed by the data parallel computer enables the data parallel computer to set the second initialization flag to the predetermined value such that the second initialization flag indicates that the initialization function has not been executed in the data parallel computer; and (l) twelfth means for emitting to the target code, in response to detection of the scalar variable declaration statement, at least one statement which when executed by the data parallel computer enables the data parallel computer to set the scalar variable equal to an address of the parallel variable after the allocation function associated with the parallel variable has executed in the data parallel computer.

16. The system of claim 15, wherein execution of the start trap function in the data parallel computer further enables the data parallel computer to determine by reference to the second initialization flag whether the initialization function has been executed in the data parallel computer, to invoke the initialization function when the initialization function has not been executed in the data parallel computer, and to set the second initialization flag to a second predetermined value such that the second initialization flag indicates that the initialization function has been executed in the data parallel computer to thereby prevent the initialization function from being executed more than once in the data parallel computer, and wherein the seventh means comprises means for emitting to the target code at least one statement which when executed in the data parallel computer enables the data parallel computer to invoke the start trap function before the scalar variable is used during execution of the target code in the data parallel computer.

17. The system of claim 14, wherein the third means comprises means for emitting to the target code at least one statement which when executed in the data parallel computer enables the data parallel computer to allocate and assign an unused field from a memory heap in each of the processing nodes for the data instances of the parallel variable.

18. The system of claim 14, wherein the third means comprises:

(1) means for emitting to the target code at least one statement which when executed in the data parallel computer enables the data parallel computer to allocate an unused field from a memory heap in each of the processing nodes for a parallel variable group, wherein the parallel variable group includes the parallel variable;

(2) means for emitting to the target code at least one statement which when executed in the data parallel computer enables the data parallel computer to assign a portion of the allocated field in each of the processing nodes to the data instances of the parallel variable; and (3) means for emitting to the target code at least one statement which when executed in the data parallel computer enables the data parallel computer to assign other portions of the allocated field in each of the processing nodes to data instances of other parallel variables in the parallel variable group.

19. The system of claim 18, wherein the parallel variable group comprises parallel variables declared in the source code declaration statement.

20. The system of claim 18, wherein the parallel variable group comprises parallel variables having identical scope and lexically identical shape.

21. The system of claim 18, wherein the parallel variable group comprises parallel variables having identical scope and equivalent shape.

22. The system of claim 14, wherein execution of the start trap function in the data parallel computer also enables the data parallel computer to set the initialization flag to a second predetermined value after the allocation function has been executed in the data parallel computer, to thereby prevent the allocation function from being executed more than once in the data parallel computer.

23. A computer based system for generating a target code from a source code, the source code written using a high level language supporting data parallel processing, the target code to be executed in a data parallel computer having a plurality of processing nodes for processing data in parallel, the system comprising:
- means for detecting in the source code a statement declaring a shape having P positions organized among R dimensions, the shape being a template for use in declaring parallel variables each having P data instances distributed among P processing nodes logically organized among R dimensions;
- means for emitting to the target code, in response to said detection, an allocation function which when executed in the data parallel computer enables the data parallel computer to allocate the shape to a processor set, the processor set comprising P of the processing nodes;
- means for emitting to the target code, in response to said detection, at least one statement which when executed in the data parallel computer enables the data parallel computer to establish an initialization flag to indicate whether the allocation function has been executed in the data parallel computer;
- means for emitting to the target code, in response to said detection, at least one statement which when executed in the data parallel computer enables the data parallel computer to set the initialization flag to a predetermined value such that the initialization flag indicates that the allocation function has not been executed in the data parallel computer;
- means for emitting to the target code, in response to said detection, a start trap function which when executed in the data parallel computer enables the data parallel computer to determine by reference to the initialization flag whether the allocation function has been executed in the data parallel computer, and to invoke the allocation function when the allocation function has not been executed in the data parallel computer; and
- means for emitting to the target code, in response to said detection, at least one statement which when executed in the data parallel computer enables the data parallel computer to invoke the start trap function before the shape is referenced during execution of the target code in the data parallel computer.

24. The system of claim 23, further comprising means for emitting to the target code, in response to said detection, at least one statement which when executed in the data parallel computer enables the data parallel computer to determine whether the shape is fully specified, partially specified, or unspecified.

25. The system of claim 23, wherein execution of the start trap function in the data parallel computer also enables the data parallel computer to set the initialization flag to a second predetermined value after the allocation function has been executed in the data parallel computer, to thereby prevent the allocation function from being executed more than once in the data parallel computer.

26. A system, comprising:
- a data parallel computer having a plurality of processing nodes for processing data in parallel;
- control means for controlling the data parallel computer, comprising:
  - means for declaring a parallel variable having P data instances;
  - means for allocating memory in P of the processing nodes for the parallel variable, and for assigning each of the P data instances of the parallel variable to the allocated memory in one of the P processing nodes;
  - means for defining and setting an initialization flag to a predetermined value such that the initialization flag indicates that the allocating and assigning means has not executed;
  - start trap means for determining by reference to the initialization flag whether the allocating and assigning means has executed, and for invoking the allocating and assigning means when the allocating and assigning means has not executed; and
  - means for invoking the start trap means such that the start trap means invokes the allocating and assigning means before the parallel variable is used during operation of the system.

27. The system of claim 26, wherein the allocating and assigning means comprises means for allocating and assigning an unused field from a memory heap in each of the processing nodes to the data instances of the parallel variable.

28. The system of claim 26, wherein the allocating and assigning means comprises:
- means for allocating an unused field from a memory heap in each of the processing nodes to a parallel variable group, wherein the parallel variable group includes the parallel variable;
- means for assigning a portion of the allocated field in each of the processing nodes to the data instances of the parallel variable; and
- means for assigning other portions of the allocated field in each of the processing nodes to data instances of other parallel variables in the parallel variable group.

29. The system of claim 28, wherein the parallel variable group comprises parallel variables declared by the declaring means.

30. The system of claim 28, wherein the parallel variable group comprises parallel variables having identical scope and lexically identical shape.

31. The system of claim 28, wherein the parallel variable group comprises parallel variables having identical scope and equivalent shape.

32. A system, comprising:
- a data parallel computer having a plurality of processing nodes for processing data in parallel;
- control means for controlling the data parallel computer, comprising:

means for declaring a shape having P positions organized among R dimensions, the shape being a template for use in declaring parallel variables each having P data instances distributed among P processing nodes logically organized among R dimensions;

means for allocating the shape to a processor set, the processor set comprising P of the processing nodes of the data parallel computer;

means for establishing and setting an initialization flag to a predetermined value such that the initialization flag indicates that the allocating means has not executed in the data parallel computer;

start trap means for determining by reference to the initialization flag whether the allocating means has executed in the data parallel computer, and for invoking the allocating means when the allocating means has not executed in the data parallel computer; and means for invoking the start trap means such that the start trap means invokes the allocating means before the shape is referenced during operation of the system.

33. A system for generating a target code from a source code, the source code written using a high level language supporting data parallel processing, the target code to be executed by a data parallel computer comprising a plurality of processing nodes for processing data in parallel, the system comprising:

a parallel variable detector to detect in the source code a statement declaring a parallel variable, the parallel variable comprising a plurality of data instances each processed by one of the processing nodes when the target code is executed by the data parallel computer;

an allocation function generator to emit to the target code, in response to said detection, an allocation function which when executed by the data parallel computer enables the data parallel computer to allocate memory in the processing nodes for the data instances of the parallel variable;

an initialization flag generator to emit to the target code, in response to said detection, at least one statement which when executed by the data parallel computer enables the data parallel computer to establish and set an initialization flag to a predetermined value such that the initialization flag indicates that the allocation function has not been executed in the data parallel computer;

a start trap function generator to emit to the target code, in response to said detection, a start trap function which when executed by the data parallel computer enables the data parallel computer to determine by reference to the initialization flag whether the allocation function has been executed in the data parallel computer, and also enables the data parallel computer to invoke the allocation function when the allocation function has not been executed in the data parallel computer; and a code invocation mechanism to emit to the target code, in response to said detection, at least one statement which when executed by the data parallel computer enables the data parallel computer to invoke the start trap function before the parallel variable is used during operation of the system.

34. A system for generating a target code from a source code, the source code written using a high level language supporting data parallel processing, the target code to be executed by a data parallel computer comprising a plurality of processing nodes for processing data in parallel, the system comprising:

a parallel variable detector to detect in the source code a statement declaring a shape having P positions organized among R dimensions, the shape being a template for use in declaring parallel variables each having P data instances distributed among P processing nodes logically organized among R dimensions;

an allocation function generator to emit to the target code, in response to said detection, an allocation function which when executed in the data parallel computer enables the data parallel computer to allocate the shape to a processor set, the processor set comprising P of the processing nodes;

an initialization flag generator to emit to the target code, in response to said detection, at least one statement which when executed in the data parallel computer enables the data parallel computer to establish and set an initialization flag to a predetermined value such that the initialization flag indicates that the allocation function has not been executed in the data parallel computer;

a start trap function generator to emit to the target code, in response to said detection, a start trap function which when executed in the data parallel computer enables the data parallel computer to determine by reference to the initialization flag whether the allocation function has been executed in the data parallel computer, and to invoke the allocation function when the allocation function has not been executed in the data parallel computer; and a code invocation mechanism to emit to the target code, in response to said detection, at least one statement which when executed in the data parallel computer enables the data parallel computer to invoke the start trap function before the shape is referenced during operation of the system.

* * * * *